US010860135B2

(12) United States Patent
Yoo et al.

(10) Patent No.: US 10,860,135 B2
(45) Date of Patent: Dec. 8, 2020

(54) DISPLAY PANEL, DISPLAY DEVICE, AND DRIVING CIRCUIT

(71) Applicant: LG DISPLAY CO., LTD., Seoul (KR)

(72) Inventors: DukKeun Yoo, Seoul (KR); HyunGon Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/709,824

(22) Filed: Dec. 10, 2019

(65) Prior Publication Data

US 2020/0210043 A1 Jul. 2, 2020

(30) Foreign Application Priority Data

Dec. 28, 2018 (KR) .......................... 10-2018-0173157

(51) Int. Cl.
*G06F 3/042* (2006.01)
*G06F 3/041* (2006.01)

(52) U.S. Cl.
CPC .......... *G06F 3/04166* (2019.05); *G06F 3/042* (2013.01); *G06F 2203/04106* (2013.01)

(58) Field of Classification Search
CPC ................. G06F 3/04166; G06F 3/042; G06F 2203/04106; G06F 3/0412
See application file for complete search history.

(56) References Cited

U.S. PATENT DOCUMENTS

| 2012/0313913 A1 | 12/2012 | Shiraki et al. |
| 2014/0061651 A1 | 3/2014 | Chang et al. |
| 2017/0242533 A1* | 8/2017 | Liu .................. G06F 3/0416 |

FOREIGN PATENT DOCUMENTS

TW 201101138 A 1/2011

* cited by examiner

Primary Examiner — Adam R. Giesy
(74) Attorney, Agent, or Firm — Seed IP Law Group LLP

(57) ABSTRACT

A display panel, a display device, and a driving circuit including both a touch sensor configuration and a photosensor configuration are disclosed. The driving circuit comprises a multi-sensing circuit electrically connected to a plurality of common electrodes, disposed in a display panel, through a plurality of read-out lines disposed in the display panel; and a photo-driving circuit driving a plurality of photo-driving lines and a plurality of photo-control lines through which a photo-driving signal and a photo-control signal are transferred to a plurality of phototransistors disposed in the display panel, wherein each of the plurality of phototransistors comprises a gate electrode to which the photo-control signal is applied, a first electrode to which the photo-driving signal is applied, and a second electrode serving as a signal output node, with a signal being output to the second electrode in response to illumination light, and the multi-sensing circuit receives the signal, output from the second electrode of each of the plurality of phototransistors, through a corresponding read-out line among the plurality of read-out lines. A high aperture ratio is obtained since electrode and line structures for touch sensing and photosensing are efficiently designed.

30 Claims, 25 Drawing Sheets

DISPLAY PANEL, DISPLAY DEVICE, AND DRIVING CIRCUIT

CROSS REFERENCE TO RELATED APPLICATION

This application claims priority to Korean Patent Application No. 10-2018-0173157, filed on September Dec. 28, 2018, which is hereby incorporated by reference for all purposes as if fully set forth herein.

BACKGROUND

Technical Field

Exemplary embodiments relate to a display panel, a display device, and a driving circuit.

Description of Related Art

In recent times, display devices have been able to provide touch-based user interfaces enabling users to intuitively and conveniently input data or instructions directly to devices using a finger, a pen, or the like, in addition to a display function of displaying images or information. Such a display device should be able to determine whether or not a touch has been performed by a user and accurately detect touch coordinates in order to provide such a touch-based input interface.

In addition, display devices may have a variety of designs, and may be used in a variety of environments. Accordingly, display devices may have unique designs and a variety of input interfaces suitable for a variety of environments.

BRIEF SUMMARY

Various embodiments of the present disclosure provide a display panel, a display device, and a driving circuit having both a touch sensing function and a photosensing function.

Also provided are a display panel, a display device, and a driving circuit, in which a touch sensor configuration and a photosensor configuration are efficiently designed.

Also provided are a display panel, a display device, and a driving circuit having a high aperture ratio even in the case that both the touch sensor configuration and the photosensor configuration are included.

Also provided are a display panel, a display device, and a driving circuit, in which electrode and line structures for touch sensing and photosensing are efficiently designed.

Also provided are a display panel, a display device, and a driving circuit able to provide various types of light-based input environment to users.

According to an embodiment of the present disclosure, a display panel may include: a plurality of subpixels; a plurality of data lines and a plurality of gate lines configured to drive the plurality of subpixels; a plurality of phototransistors respectively including a gate electrode configured to receive a photo-control signal, a first electrode configured to receive a photo-driving signal, and a second electrode serving as a signal output node configured to output a signal to the second electrode in response to illumination light; and a plurality of photo-driving lines and a plurality of photo-control lines configured to transfer the photo-driving signal and the photo-control signal, respectively, to the plurality of phototransistors.

In the display panel, a first subpixel row, a second subpixel row, a third subpixel row, and a fourth subpixel row, respectively include subpixels among the plurality of subpixels.

The plurality of phototransistors may include a first phototransistor and a second phototransistor positioned between the first subpixel row and the second subpixel row.

A first photo-driving line among the plurality of photo-driving lines and a first photo-control line among the plurality of photo-control lines may be positioned between the first subpixel row and the second subpixel row. The first photo-driving line is configured to transfer the photo-driving signal to the first electrode of each of the first phototransistor and the second phototransistor. The first photo-control line is configured to transfer the photo-control signal to the gate electrode of each of the first phototransistor and the second phototransistor.

The first photo-driving line and the first photo-control line may overlap each other at one or more points of overlap.

A photocapacitor may be electrically connected to the second electrode and the gate electrode of the phototransistor.

The second phototransistor may have an electrode structure reversed from an electrode structure of the first phototransistor.

One of the second electrode of the first phototransistor or the second electrode of the second phototransistor may be positioned adjacent to the first subpixel row, and the other of the second electrode of the first phototransistor or the second electrode of the second phototransistor may be positioned adjacent to the second subpixel row.

One of the gate electrode of the first phototransistor or the gate electrode of the second phototransistor may be disposed adjacent to the first subpixel row, while the other of the gate electrode of the first phototransistor or the gate electrode of the second phototransistor may be positioned adjacent to the second subpixel row.

Each of the points of overlap between the first photo-driving line and the first photo-control line may be located between the first phototransistor and the second phototransistor.

Each of the points of overlap between the first photo-driving line and the first photo-control line may overlap a corresponding data line among the plurality of data lines.

Alternatively, each of the points of overlap between the first photo-driving line and the first photo-control line may be located between a read-out line, electrically connected to the second electrode of each of the first phototransistor and the second phototransistor, and a corresponding data line among the plurality of data lines.

The plurality of phototransistors may further include a third phototransistor and a fourth phototransistor positioned between the second subpixel row and the third subpixel row.

In one embodiment, none of the plurality of phototransistors, the plurality of photo-driving lines, and the plurality of photo-control lines may be positioned between the second subpixel row and the fourth subpixel row.

In a case in which the third phototransistor and the fourth phototransistor are positioned between the second subpixel row and the third subpixel row, a second photo-driving line among the plurality of photo-driving lines and a second photo-control line among the plurality of photo-control lines may be positioned between the second subpixel row and the third subpixel row. The second photo-driving line is configured to transfer the photo-driving signal to the first electrode of each of the third phototransistor and the fourth phototransistor, and the second photo-control line is configured to transfer the photo-control signal to the gate electrode of each of the third phototransistor and the fourth phototransistor.

The second photo-driving line and the second photo-control line may overlap each other at one or more points of overlap.

The first photo-driving line and the first photo-control line may be positioned between a first gate line, among the plurality of gate lines configured to transfer a scan signal to the first subpixel row, and a second gate line, among the plurality of gate lines, configured to transfer the scan signal to the second subpixel row.

The first subpixel row may include first to fifth subpixels. The plurality of data lines may include a first data line configured to transfer a data signal sequentially to the first subpixel and the second subpixel, and a second data line configured to transfer the data signal sequentially to the third subpixel and the fourth subpixel. The plurality of gate lines may include a first gate line configured to transfer a scan signal sequentially to the first subpixel, the third subpixel, and the fifth subpixel, and a second gate line configured to transfer the scan signal sequentially to the second subpixel and the fourth subpixel.

The display panel may further include: a first common electrode to which the second electrode of the first phototransistor and the second electrode of the second phototransistor are electrically connected; a first read-out line positioned between the second subpixel and the third subpixel; and a second read-out line positioned between the fourth subpixel and the fifth subpixel.

One of the first read-out line or the second read-out line may be electrically connected to the first common electrode to which the second electrode of the first phototransistor and the second electrode of the second phototransistor are commonly connected.

The other one of the first read-out line or the second read-out line may be electrically connected to neither the second electrode of the first phototransistor nor the second electrode of the second phototransistor, and may be electrically connected to the second common electrode positioned in the same row as the first common electrode in the display panel and insulated from the first common electrode.

Each of the first read-out line and the second read-out line may overlap both the first common electrode and the second common electrode.

Two or more data lines, among the plurality of data lines, overlapping the first common electrode, may be the same as two or more data lines, among the plurality of data lines, overlapping the second common electrode. Each of the first read-out line and the second read-out line may be positioned in the same direction as the overlapping two or more data lines.

Each of the first common electrode and the second common electrode may include a main electrode and a subsidiary electrode made of different materials and contacting each other at one or more points.

The main electrode may be made of the same material as a pixel electrode in each of the plurality of subpixels, and the subsidiary electrode may be made of the same material as at least one of the plurality of gate lines or the first photo-control line.

The display panel may be divided into an active area serving as a display area and a non-active area serving as a non-display area. The non-active area may include a dummy pixel area that includes a plurality of dummy subpixels.

One or more dummy phototransistors, a main photo-driving line, among the plurality of photo-driving lines, to which the first photo-driving line is electrically connected, and a main photo-control line, among the plurality of photo-control lines, to which the first photo-control line is electrically connected, may be positioned in the dummy pixel area.

At least one of the main photo-driving line or the main photo-control line may be electrically connected to the plurality of dummy subpixels.

The main photo-driving line and the main photo-control line may include the same material as the plurality of data lines.

The first photo-driving line and the first photo-control line may be extending in the same direction as the plurality of gate lines. The main photo-driving line and the main photo-control line may be extending in the same direction as the plurality of data lines overlapping the plurality of gate lines.

Each of the plurality of subpixels may include a pixel electrode and a driving transistor transferring the data signal to the pixel electrode.

In a case in which a top surface of the display panel corresponds to a viewing surface, a touch surface, and a light illumination surface, a gate electrode of the driving transistor and the gate electrode of each phototransistor among the plurality of phototransistors may be located on the same layer, an active layer of the driving transistor and an active layer of the phototransistor may be located on the same layer, and the active layer of the driving transistor and the active layer of the phototransistor may be located above the gate electrode of the driving transistor and the gate electrode of the phototransistor, respectively.

In a case in which a bottom surface of the display panel corresponds to a viewing surface, a touch surface, and a light illumination surface, an active layer of the driving transistor is located above a gate electrode of the driving transistor, and an active layer of each phototransistor among the plurality of phototransistors may be located below the gate electrode of the phototransistor, the first electrode and the second electrode of the phototransistor are located on the same layer as the gate electrode of the driving transistor, and the gate electrode of the phototransistor may be located on the same layer as a first electrode and a second electrode of the driving transistor, and the active layer of the phototransistor may be located on a different layer from the active layer of the driving transistor.

In a case in which a bottom surface of the display panel corresponds to a viewing surface, a touch surface, and a light illumination surface, an active layer of the driving transistor is located above a gate electrode of the driving transistor, and a first electrode and a second electrode may be located on the active layer, an active layer of each phototransistor among the plurality of phototransistors may be located below the gate electrode of the phototransistor, the first electrode and the second electrode of the phototransistor may be located between the active layer and the gate electrode of the phototransistor, the gate electrode of the phototransistor may be made of the same material as the first electrode and the second electrode of the driving transistor, the first electrode and the second electrode of the phototransistor may be made of the same material as the gate electrode of the driving transistor, the active layer of the phototransistor may be located on a different layer from the active layer of the driving transistor, and a semiconductor material layer may be disposed below the gate electrode of the driving transistor, and contains the same material as the active layer of the phototransistor.

During a display driving period, photo-driving lines among the plurality of photo-driving lines and photo-control lines among the plurality of photo-control lines may be floated or the photo-driving signal and the photo-control signal respectively having a predetermined voltage level may be applied to photo-driving lines among the plurality of photo-driving lines and photo-control lines among the plurality of photo-control lines.

During a blank period after the display driving period, the voltage level of each of the photo-driving signal and the photo-control signal may swings.

During the blank period, a touch driving signal having a swinging voltage level may be applied to a first common electrode, to which the second electrode of the first phototransistor and the second electrode of the second phototransistor are commonly connected, and at least one of a frequency, a phase, and an amplitude of either the photo-driving signal or the photo-control signal may correspond to that of the touch driving signal.

During the blank period, the photo-control signal may swing in the range of a turn-off voltage, by which the phototransistor is turned off.

According to another embodiment, a display panel may include: a plurality of subpixels; a plurality of data lines and a plurality of gate lines configured to drive the plurality of subpixels are driven; a plurality of phototransistors respectively including a gate electrode configured to receive a photo-control signal, a first electrode configured to receive a photo-driving signal, and a second electrode serving as a signal output node configured to output a signal to the second electrode in response to illumination light; and a plurality of photo-driving lines and a plurality of photo-control lines configured to transfer the photo-driving signal and the photo-control signal, respectively, to the plurality of phototransistors.

A first subpixel row, a second subpixel row, a third subpixel row, and a fourth subpixel row, respectively included of subpixels among the plurality of subpixels, may be sequentially arrayed.

The plurality of phototransistors may include a first phototransistor and a second phototransistor positioned between the first subpixel row and the second subpixel row.

A first photo-driving line and a second photo-driving line, among the plurality of photo-driving lines, to which the first electrode of the first phototransistor and the first electrode of the second phototransistor are electrically connected, respectively, may be disposed between the first subpixel row and the second subpixel row. A shared photo-control line, among the plurality of photo-control lines, to which the gate electrode of the first phototransistor and the gate electrode of the second phototransistor are electrically connected, may be disposed between the first subpixel row and the second subpixel row.

Alternatively, a first photo-control line and a second photo-control line, among the plurality of photo-control lines, to which the gate electrode of the first phototransistor and the gate electrode of the second phototransistor are electrically connected, respectively, may be disposed between the first subpixel row and the second subpixel row. A shared photo-driving line, among the plurality of photo-driving lines, to which the first electrode of the first phototransistor and the first electrode of the second phototransistor are electrically connected, may be disposed between the first subpixel row and the second subpixel row.

In one embodiment, none of the plurality of phototransistors, the plurality of photo-driving lines, and the plurality of photo-control lines may be positioned between the second subpixel row and the third subpixel row.

A photocapacitor may be electrically connected between the second electrode and the gate electrode of the phototransistor.

According to another embodiment, a display device may include: a display panel including a plurality of data lines, a plurality of gate lines, a plurality of subpixels, a plurality of common electrodes, a plurality of phototransistors, a plurality of read-out lines electrically connected to the plurality of common electrodes, and a plurality of photo-driving lines and a plurality of photo-control lines configured to transfer a photo-driving signal and a photo-control signal, respectively, to the plurality of phototransistors; a multi-sensing circuit configured to drive the plurality of common electrodes; and a photo-driving circuit configured to drive the plurality of photo-driving lines and the plurality of photo-control lines.

Each of the plurality of phototransistors may include a gate electrode configured to receive the photo-control signal, a first electrode configured to receive the photo-driving signal, and a second electrode serving as a signal output node configured to output a signal to the second electrode in response to illumination light.

The plurality of common electrodes may include a first common electrode and a second common electrode.

The plurality of read-out lines may include a first read-out line electrically connecting the first common electrode and the multi-sensing circuit and a second read-out line electrically connecting the second common electrode and the multi-sensing circuit.

Two or more phototransistors among the plurality of phototransistors may be positioned in an area of the first common electrode, and the second electrode of each of the two or more phototransistors may be electrically connected to the first common electrode.

During a display driving period, the photo-driving circuit may float photo-driving lines among the plurality of photo-driving lines and photo-control lines among the plurality of photo-control lines, or may output the photo-driving signal and the photo-control signal respectively having a predetermined voltage level to photo-driving lines among the plurality of photo-driving lines and photo-control lines among the plurality of photo-control lines.

The multi-sensing circuit may output a common voltage having a predetermined voltage level to the plurality of common electrodes through the plurality of read-out lines.

During a blank period after the display driving period, the photo-driving circuit may output the photo-driving signal and the photo-control signal respectively having a swinging voltage level to photo-driving lines among the plurality of photo-driving lines and photo-control lines among the plurality of photo-control lines.

The multi-sensing circuit may output a touch driving signal having a swinging voltage level to the plurality of common electrodes through the plurality of read-out lines.

During the blank period, at least one of the frequency, the phase, or the amplitude of either the photo-driving signal or the photo-control signal may correspond to that of the touch driving signal.

During the blank period, the photo-control signal may swing in the range of a turn-off voltage, by which the phototransistor is turned off.

The multi-sensing circuit may output sensing data using a signal detected through the plurality of read-out lines.

The display device may further include a multi-controller configured to detect a touch or touch coordinates on the display panel, or detect a light illumination or light-illuminated coordinates on the display panel, using the sensing data.

The multi-controller may recognize and distinguish a type of a light-based input, using the light-illuminated coordinates and a point in time and a continuous detection time of the light-illuminated coordinates.

According to another embodiment, a driving circuit may include: a multi-sensing circuit electrically connected to a plurality of common electrodes of a display panel, through a plurality of read-out lines of the display panel; and a photo-driving circuit configured to drive a plurality of photo-driving lines and a plurality of photo-control lines through which a photo-driving signal and a photo-control signal are transferred to a plurality of phototransistors of the display panel.

Each of the plurality of phototransistors may include a gate electrode configured to receive the photo-control signal, a first electrode configured to receive the photo-driving signal, and a second electrode serving as a signal output node configured to output a signal to the second electrode in response to illumination light.

The multi-sensing circuit may receive the signal, output from the second electrode of each of the plurality of phototransistors, through a corresponding read-out line among the plurality of read-out lines.

According to exemplary embodiments, the display panel, the display device, and the driving circuit have both a touch sensing function and a photosensing function.

In addition, according to exemplary embodiments, in the display panel, the display device, and the driving circuit, a touch sensor configuration and a photosensor configuration are efficiently designed.

Furthermore, according to exemplary embodiments, the display panel, the display device, and the driving circuit have a high aperture ratio even in the case that both the touch sensor configuration and the photosensor configuration are included.

In addition, according to exemplary embodiments, in the display panel, the display device, and the driving circuit, electrode and line structures for touch sensing and photosensing are efficiently designed.

Furthermore, according to exemplary embodiments, the display panel, the display device, and the driving circuit can provide various types of light-based input environment to users.

DESCRIPTION OF THE SEVERAL VIEWS OF THE DRAWINGS

The above and other features and advantages of the present disclosure will be more clearly understood from the following detailed description, taken in conjunction with the accompanying drawings, in which.

DETAILED DESCRIPTION

Figure 1:
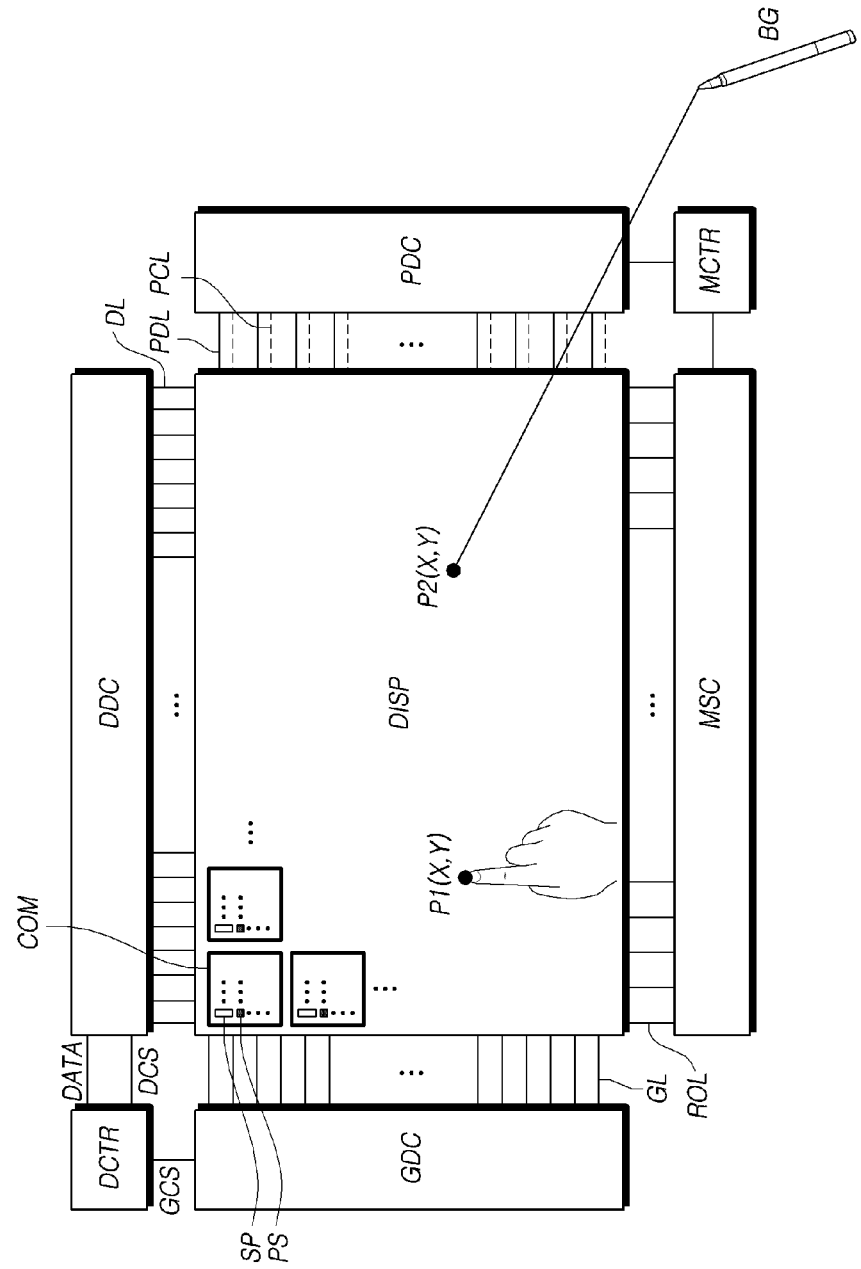
FIG. 1 illustrates a system configuration of a display device according to exemplary embodiments.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in many different forms. Rather, these embodiments are provided so that the present disclosure will be thorough and complete, and will fully convey the scope of the present disclosure to a person having ordinary skill in the art. The scope of the present disclosure shall be defined by the appended Claims.

The shapes, sizes, ratios, angles, numbers, and the like, inscribed in the drawings to illustrate exemplary embodiments are illustrative, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of components according to exemplary embodiments, it shall be understood that an error range is included therein, even in the case in which there is no explicit description thereof.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element. In the same context, it will be understood that when an element is referred to as being formed "on" or "under" another element, not only can it be directly located on or under the other element, but it can also be indirectly located on or under the other element via an intervening element.

In addition, terms, such as "first" and "second" may be used herein to describe a variety of components. It should be understood, however, that these components are not limited by these terms. These terms are merely used to discriminate one element or component from other elements or components. Thus, a first element referred to as first hereinafter may be a second element within the spirit of the present disclosure.

The features of exemplary embodiments of the present disclosure may be partially or entirely coupled or combined with each other and may work in concert with each other or may operate in a variety of technical methods. In addition, respective exemplary embodiments may be carried out independently or may be associated with and carried out in concert with other embodiments.

Hereinafter, exemplary embodiments will be described in detail with reference to the drawings.

Figure 2:
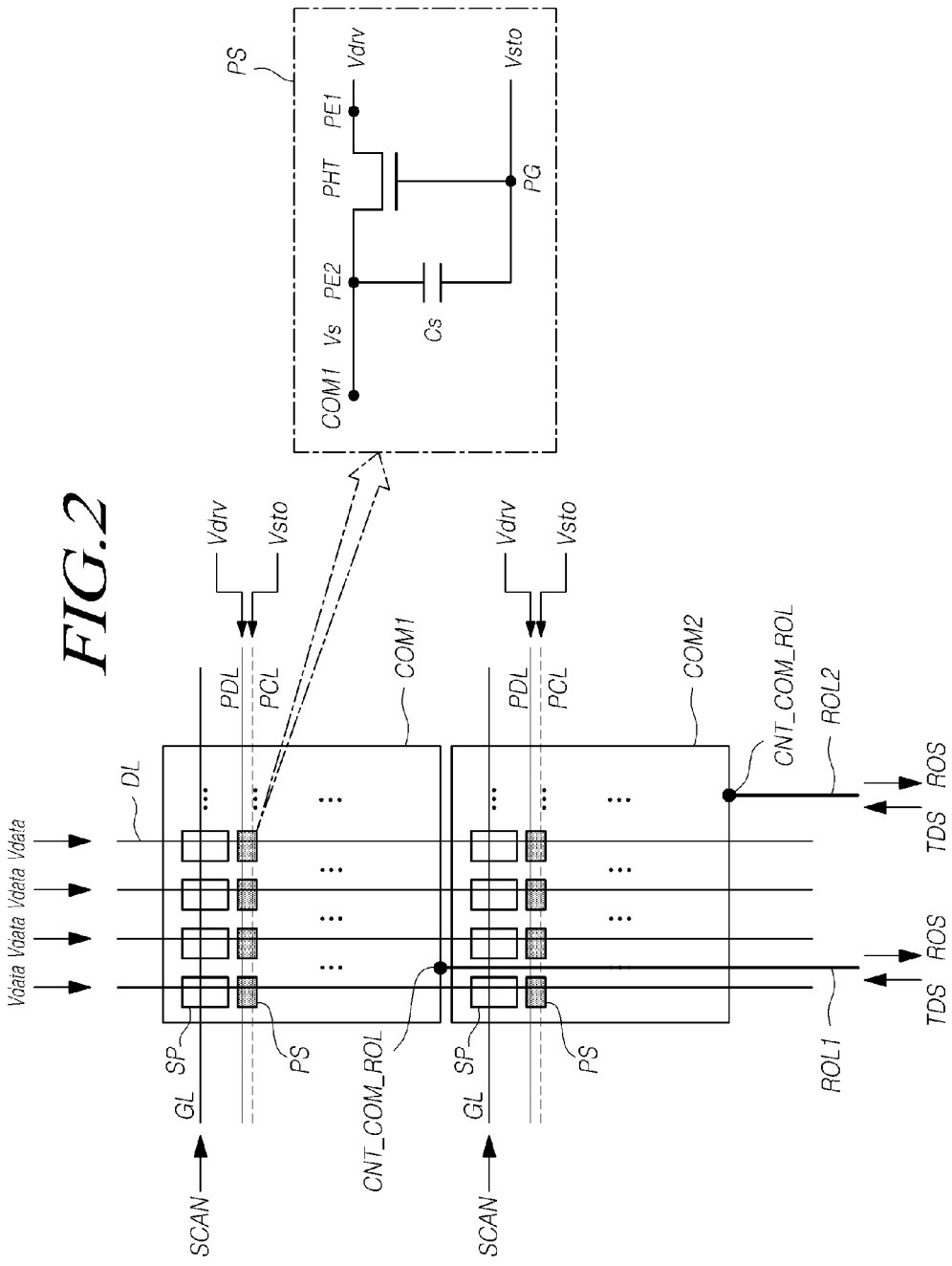
FIG. 2 illustrates a basic multi-sensor configuration of a display panel according to exemplary embodiments.

FIG. 1 illustrates a system configuration of a display device according to exemplary embodiments, and FIG. 2 illustrates a basic multi-sensor configuration of a display panel DISP according to exemplary embodiments.

Referring to FIG. 1, the display device according to exemplary embodiments may provide not only a basic display function, but also a multi-sensing function, including a touch sensing function, a photosensing function, and the like.

When a user touches a point P1(X,Y) on the display panel DISP using a finger, a pen, or the like in a contacting manner or in a non-contacting manner, the display device may detect the touch on the point P1(X,Y) using the touch sensing function and perform a process (e.g., input, selection, or execution of an application program) depending on the result of the sensing.

When the user illuminates a point P2(X,Y) on the display panel DISP with light using a beam generator BG, the display device may detect light illuminating the point P2(X,Y) using the photosensing function and perform a process (e.g., input, selection, or execution of an application program) depending on the result of the sensing.

The beam generator BG may be included in, for example, a laser pointer, a remote control, or the like. The beam generator BG may emit highly-collimated light. For example, the beam generator BG may emit a laser beam. Here, in an example, laser beams, or the like, emitted from the beam generator BG, may have a variety of wavelengths or a variety of colors.

The display device may include the display panel DISP, a data driving circuit DDC, a gate driving circuit GDC, a display controller DCTR, or the like.

The display device may include the display panel DISP, a photo-driving circuit PDC, a multi-sensing circuit MSC, a multi-controller MCTR, and the like, in order to provide the multi-sensing function, including the touch sensing function and the photosensing function.

Referring to FIG. 1, a plurality of data lines DL, a plurality of gate lines GL, and a plurality of subpixels SP may be disposed in the display panel DISP to provide the display function.

The plurality of data lines DL and the plurality of gate lines GL may be disposed in different directions to overlap each other. The plurality of data lines DL may be disposed in a column direction or in a row direction, while the plurality of gate lines GL may be disposed in a row direction or in a column direction. Hereinafter, the plurality of data lines DL will be described as being disposed in the column direction (i.e., a vertical direction), while the plurality of gate lines GL will be described as being disposed in the row direction (i.e., a horizontal direction).

Each of the plurality of subpixels SP may include a driving transistor and a pixel electrode. The driving transistor may be turned on by a scan signal SCAN, applied to a gate electrode thereof through a corresponding gate line GL among the plurality of gate lines GL, to apply a data signal Vdata, supplied thereto through a corresponding data line DL among the plurality of data lines DL, to the pixel electrode.

The display panel DISP may include a plurality of common electrodes COM, a plurality of read-out lines ROL, a plurality of photosensors PS, a plurality of photo-driving lines PDL, a plurality of photo-control lines PCL, and the like.

The touch sensing configuration of the display device may include the plurality of common electrodes COM serving as touch sensors. The touch sensing configuration may further include the read-out lines ROL electrically connected to the plurality of common electrodes COM, in addition to the plurality of common electrodes COM.

The display device may perform self-capacitance-based touch sensing or mutual-capacitance-based touch sensing. Hereinafter, the display device will be described as performing self-capacitance-based touch sensing, for the sake of brevity.

In addition, each of the common electrodes COM may be a plate-shaped electrode without an open area, a mesh-shaped electrode having open areas, or an electrode bent at one or more points.

The photosensing configuration of the display device may include the plurality of photosensors PS. Each of the plurality of photosensors PS may include a phototransistor PHT. In some cases, each of the plurality of photosensors PS may further include a photocapacitor Cs.

The photosensing configuration may further include the plurality of photo-driving lines PDL and the plurality of photo-control lines PCL, through which a photo-driving signal Vdrv and a photo-control signal Vsto are transferred to a plurality of phototransistors PHT, in addition to the plurality of photosensors PS. In some cases, the photosensing configuration may further include the common electrodes COM and the read-out lines ROL.

Each of the plurality of phototransistors PHT may include a gate electrode PG to which the photo-control signal Vsto is applied, a first electrode PE1 to which the photo-driving signal Vdrv is applied, a second electrode PE2 serving as a signal output node, and the like.

The photocapacitor Cs may be electrically connected between the second electrode PE2 and the gate electrode PG of the phototransistor PHT. The photocapacitor Cs may or may not be present in every photosensor PS.

The photo-control signal Vsto may be applied to the gate electrode of the phototransistor PHT through a corresponding photo-control line PCL among the plurality of photo-control lines PCL. The photo-driving signal Vdrv may be applied to the first electrode PE1 of the phototransistor PHT through a corresponding photo-driving line PDL among the plurality of photo-driving lines PDL. Each of the plurality of phototransistors PHT may output a signal Vs via the second electrode PE2, in response to illumination light.

Two or more phototransistors PHT may be present in each area of the plurality of common electrodes COM.

The second electrode PE2 of each of the two or more phototransistors PHT, disposed in each area of the plurality of common electrodes COM, may be electrically connected to the corresponding common electrode COM.

Thus, the signal Vs, output from each of the plurality of phototransistors PHT via the second electrode PE2 in response to illumination light, may be transferred to a corresponding read-out line ROL among the plurality of read-out lines ROL via the corresponding common electrode COM.

Components related to this multi-sensing function in the display panel DISP may be categorized with respect to the touch sensing function and the photosensing function. The plurality of phototransistors PHT, the plurality of photo-driving lines PDL, and the plurality of photo-control lines PCL are components related to the photosensing function. In addition, fundamentally, the plurality of common electrodes COM and the plurality of read-out lines ROL are essential components for the photosensing function while being components related to the touch sensing function.

The display function and the multi-sensing function will be described with respect to the driving circuits.

First, the display driving circuits for providing the display function may include the data driving circuit DDC driving the plurality of data lines DL, the gate driving circuit GDC driving the plurality of gate lines GL, the display controller DCTR controlling the operations of the data driving circuit DDC and the gate driving circuit GDC, and the like. The multi-sensing circuit MSC driving the plurality of common electrodes COM may be further included.

The display controller DCTR controls the data driving circuit DDC and the gate driving circuit GDC by supplying a variety of control signals DCS and GCS to the data driving circuit DDC and gate driving circuit GDC.

The display controller DCTR starts scanning at points in time realized by respective frames, converts image data input from an external source into image data having a data signal format readable by the data driving circuit DDC, outputs the converted digital image data DATA, and controls data driving at appropriate points in time according to the scanning.

The gate driving circuit GDC sequentially supplies a gate signal having an on or off voltage to the plurality of gate lines GL, under the control of the display controller DCTR.

When a specific gate line GL is opened by the gate driving circuit GDC, the data driving circuit DDC converts image data, received from the display controller DCTR, into an analog image signal, and supplies a data signal Vdata, corresponding to the analog image signal, to the plurality of data lines DL.

The display controller DCTR may be a timing controller used in typical display technology, may be a control device including a timing controller and performing other control functions, or may be a control device different from the timing controller.

The display controller DCTR may be provided as a component separate from the data driving circuit DDC, or may be provided in combination with the data driving circuit DDC to form an integrated circuit (IC).

The data driving circuit DDC drives the plurality of data lines DL by supplying the data signal Vdata to the plurality of data lines DL. Herein, the data driving circuit DDC is also referred to as a "source driver."

The data driving circuit DDC may include one or more source driver ICs (SDICs). Each of the source driver ICs may include a shift register, a latch circuit, a digital-to-analog converter (DAC), an output buffer, and the like. In some cases, the source driver IC may further include an analog-to-digital converter (ADC).

Each of the source driver ICs may be connected to the display panel DISP by a tape-automated bonding (TAB) method, a chip-on-glass (COG) method, a chip-on-film (COF) method, or the like.

The gate driving circuit GDC sequentially drives the plurality of gate lines GL by sequentially supplying the scan signal SCAN to the plurality of gate lines GL. Herein, the gate driving circuit GDC is also referred to as a "scanning driver."

Here, the scan signal SCAN is comprised of an off-level gate voltage by which the corresponding gate line GL is closed and an on-level gate voltage by which the corresponding gate line GL is opened.

The gate driving circuit GDC may include one or more gate driver ICs (GDICs). Each of the gate driver ICs may include a shift register, a level shifter, and the like.

Each of the gate driver ICs may be connected to the display panel DISP by a chip-on-glass (COG) method, a chip-on-film (COF) method, or the like, or may be implemented using a gate-in-panel (GIP) structure disposed within display panel DISP.

The data driving circuit DDC may be disposed on one side of the display panel DISP (e.g., above or below the display panel DISP), as illustrated in FIG. 1. In some cases, the data driving circuit DDC may be disposed on both sides of the display panel DISP (e.g., above and below the display panel DISP), depending on the driving system, the design of the display panel, or the like.

The gate driving circuit GDC may be disposed on one side of the display panel DISP (e.g., to the right or left of the display panel DISP), as illustrated in FIG. 1. In some cases, the gate driving circuit GDC may be disposed on both sides of the display panel DISP (e.g., to the right and left of the display panel DISP), depending on the driving system, the design of the display panel, or the like.

The display device according to exemplary embodiments may be one of various types of display device, such as a liquid crystal display (LCD) device, an organic light-emitting display device, or a quantum dot display device. The display panel DISP according to exemplary embodiments may be one of various types of display panel, such as an LCD panel, an organic light-emitting display panel, or a quantum dot display panel.

Each of the subpixels SP arrayed in the display panel DISP may include one or more circuit elements (e.g., a transistor or capacitor).

For example, in a case in which the display panel DISP is an LCD panel, a pixel electrode is disposed in each of the subpixels SP, and a driving transistor may be electrically connected between the pixel electrode and the corresponding data line DL. The driving transistor may be turned on by the scan signal SCAN, supplied to a gate electrode through the gate line GL. When turned on, the driving transistor may output the data signal Vdata, supplied to a source electrode (or a drain electrode) through the data line DL, to the drain electrode (or the source electrode), so that the data signal Vdata is applied to the pixel electrode electrically connected to the drain electrode (or the source electrode). An electric field may be generated between the pixel electrode to which the data signal Vdata is applied and the common electrode COM to which a common voltage Vcom is applied, and capacitance may be formed between the pixel electrode and the common electrode COM.

Each of the subpixels SP may have a variety of structures depending on the type of the display panel, the function provided, the design, and the like.

Next, the multi-driving circuits for the multi-sensing function may include the multi-sensing circuit MSC, the photo-driving circuit PDC, the multi-controller MCTR, and the like.

The multi-sensing circuit MSC may be electrically connected to the plurality of common electrodes COM, disposed in the display panel DISP, through the plurality of read-out lines ROL disposed in the display panel DISP.

The photo-driving circuit PDC may drive the plurality of photo-driving lines PDL and the plurality of photo-control lines PCL, through which the driving signal Vdrv and the photo-control signal Vsto are transferred to the plurality of phototransistors PHT disposed in the display panel DISP.

The multi-controller MCTR may detect at least one of a touch and touch coordinates or detect at least one of light illumination and light-illuminated coordinates (i.e., a position designated by a user by light illumination, also referred to as photo-coordinates) by receiving sensing data from the multi-sensing circuit MSC.

In addition, the multi-controller MCTR may control the driving timing or the like of each of the multi-sensing circuit MSC and the photo-driving circuit PDC.

The multi-sensing circuit MSC may drive the plurality of common electrodes COM and sense the plurality of common electrodes COM. That is, the multi-sensing circuit MSC may drive the plurality of common electrodes COM by supplying a touch driving signal TDS to the plurality of common electrodes COM through the plurality of read-out lines ROL.

The photo-driving circuit PDC may drive the plurality of photo-driving lines PDL and the plurality of photo-control lines PCL. That is, the photo-driving circuit PDC may drive the plurality of photo-control lines PCL by outputting the photo-control signal Vsto to the plurality of photo-control lines PCL, and may drive the plurality of photo-driving lines PDL by outputting the photo-driving signal Vdrv to the plurality of photo-driving lines PDL.

Consequently, the photo-control signal Vsto may be applied to the gate electrodes PG of the plurality of phototransistors PHT through the plurality of photo-control lines PCL. The photo-driving signal Vdrv may be applied to the first electrodes PE1 of the plurality of phototransistors PHT through the plurality of photo-driving lines PDL.

In addition, the multi-sensing circuit MSC may sense the plurality of common electrodes COM by detecting a signal ROS from each of the plurality of common electrodes COM through the corresponding read-out line ROL among the plurality of read-out lines ROL. Here, the signal ROS, detected from the common electrode COM through the read-out line ROL, indicates the electrical state of the common electrode COM.

The signal ROS detected by the multi-sensing circuit MSC may be a signal generated in response to a finger of the user, a pen, or the like having touched the display panel. This signal may be used to determine at least one of a touch and touch coordinates.

In addition, when the display panel DISP is illuminated with light, the signal ROS detected by the multi-sensing circuit MSC may be a signal output from the phototransistor PHT disposed at a point illuminated with light. This signal may be used to determine at least one of light illumination or a light-illuminated position (i.e., a position designated by the user by light illumination).

The multi-sensing circuit MSC may generate sensing data on the basis of the signal ROS detected through the plurality of read-out lines ROL and output the sensing data to the multi-controller MCTR.

The multi-controller MCTR may detect a touch or touch coordinates on the display panel DISP according to the sensing data, or detect light illumination or light-illuminated coordinates (or photo-coordinates) on the display panel DISP, and output a sensing result.

Referring to FIG. 2, describing the basic multi-sensor configuration, the common sensors COM or the like may correspond to touch sensors, and the phototransistors PHT and the photocapacitors Cs may correspond to the photo-sensors PS.

Referring to FIG. 2, the plurality of common electrodes COM disposed in the same column may include a first common electrode COM1 and a second common electrode COM2. In addition, the plurality of read-out lines ROL may include a first read-out line ROL1 electrically connecting the first common electrode COM1 and the multi-sensing circuit MSC and a second read-out line ROL2 electrically connecting the second common electrode COM2 and multi-sensing circuit MSC.

Two or more phototransistors PHT may be disposed in the area of the first common electrode COM1, and the second electrode PE2 of each of the two or more phototransistors PHT may be electrically connected to the first common electrode COM1.

Likewise, two or more phototransistors PHT may be disposed in the area of the second common electrode COM2. The second electrode PE2 of each of the two or more phototransistors PHT disposed in the area of the second common electrode COM2 may be electrically connected to the second common electrode COM2.

The first read-out line ROL1 may overlap both the first common electrode COM1 and the second common electrode COM2. However, the first read-out line ROL1 may be electrically connected to the first common electrode COM1 through a contact hole CNT_COM_ROL while being electrically insulated from the second common electrode COM2.

The second read-out line ROL2 may overlap both the first common electrode COM1 and the second common electrode COM2. However, the second read-out line ROL2 may be electrically connected to the second common electrode COM2 through a contact hole CNT_COM_ROL while being electrically insulated from the first common electrode COM1.

Since the first common electrode COM1 and the second common electrode COM2 are disposed in the same column, the two or more data lines DL overlapping the first common electrode COM1 may be the same as the two or more data lines DL overlapping the second common electrode COM2.

Each of the first read-out line ROL1 and the second read-out line ROL2 may be disposed in the same direction as the two or more data lines DL.

Figure 3:
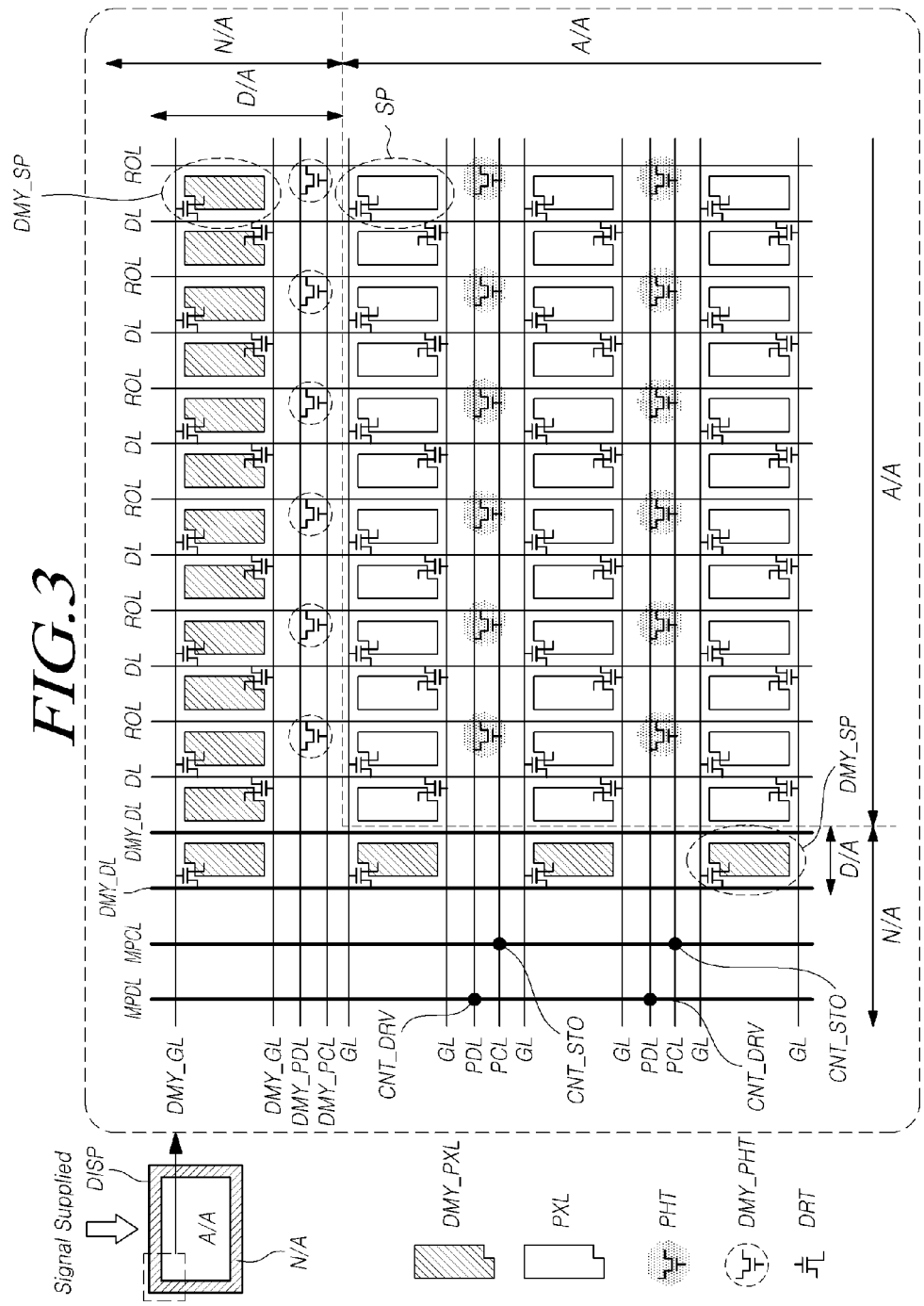
FIGS. 3 and 4 are plan views illustrating basic structures of the display panel according to exemplary embodiments.
Figure 4:
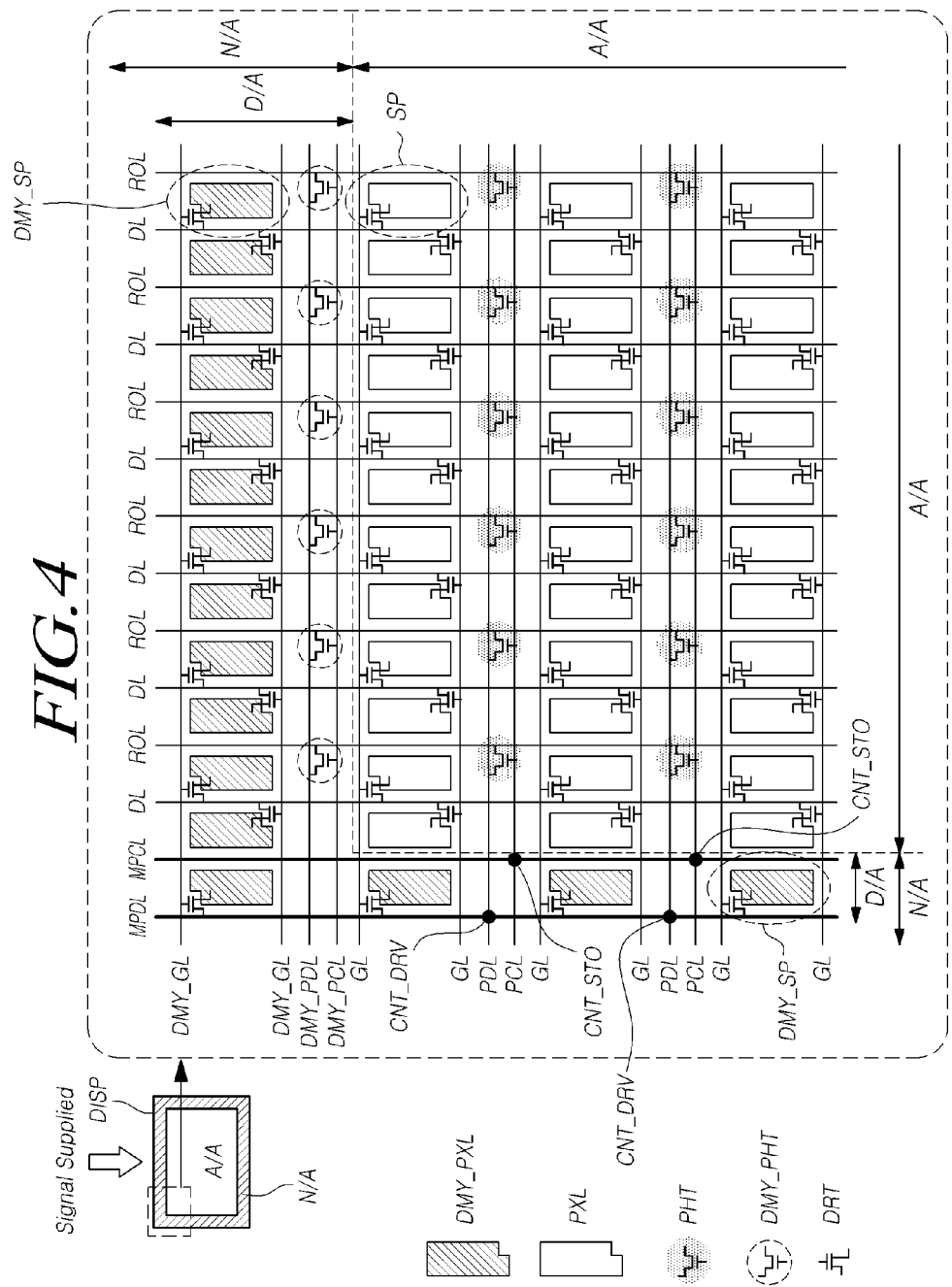

FIGS. 3 and 4 are plan views illustrating basic structures of the display panel DISP according to exemplary embodiments.

Referring to FIGS. 3 and 4, the display panel DISP is divided into an active area A/A corresponding to a display area and a non-active area N/A located at the periphery of the active area A/A and corresponding to a non-display area.

FIGS. 3 and 4 are plan views illustrating an upper left area of the display panel DISP, including a portion of the active area A/A and a portion of the non-active area N/A. The upper left area is an area to which a variety of signals (e.g., a data signal, a gate driving-related voltage, a common voltage, a photo-driving signal, and a photo-control signal) are supplied via the data driving circuit DDC, a printed circuit board (PCB), or the like.

Referring to FIGS. 3 and 4, in the display panel DISP, the plurality of data lines DL and the plurality of read-out lines ROL are disposed in the column direction (or vertical direction), and the plurality of gate lines GL, the plurality of photo-driving lines PDL, and the plurality of photo-control lines PCL may be disposed in the row direction (or horizontal direction).

Referring to FIGS. 3 and 4, in the active area A/A, the plurality of subpixels SP are arrayed in the form of a matrix. Each of the plurality of subpixels SP may include a pixel electrode PXL and a driving transistor DRT. The driving transistor DRT may be turned on by the scan signal SCAN, applied to the gate electrode through the corresponding gate line GL, to apply the data signal Vdata, supplied from the corresponding data line DL, to the pixel electrode PXL.

In addition, the plurality of phototransistors PHT may be disposed in the active area A/A.

A single phototransistor PHT may be allocated to a single subpixel SP or two or more subpixels SP.

Accordingly, a single photo-driving line PDL may be allocated to a single subpixel SP or two or more subpixels SP. A single photo-control line PCL may be allocated to a single subpixel SP or two or more subpixels SP.

In an example, as illustrated in FIGS. 3 and 4, one or more rows of phototransistors PHT may be arrayed in every corresponding subpixel row. That is, one or more rows of phototransistors PHT may be arrayed between two corresponding subpixel rows. In this case, one or more photo-driving lines PDL and one or more photo-control lines PCL may be disposed between two corresponding subpixel rows.

In another example, one or two rows of phototransistors PHT may be arrayed for two corresponding subpixel rows. For example, in a case in which a first subpixel row, a second subpixel row, a third subpixel row, and a fourth subpixel row are sequentially arrayed, one or more rows of phototransistors PHT may be arrayed between the first subpixel row and the second subpixel row, no row of phototransistors PHT may be arrayed between the second subpixel row and the third subpixel row, and one or more rows of phototransistors PHT may be arrayed between the third subpixel row and the fourth subpixel row. In this case, one or more photo-driving lines PDL and one or more photo-control lines PCL may be disposed between the first subpixel row and the second subpixel row, neither a photo-driving line PDL nor a photo-control line PCL may be disposed between the second subpixel row and the third subpixel row, and one or more photo-driving lines PDL and one or more photo-control lines PCL may be disposed between the third subpixel row and fourth second subpixel row.

Referring to FIGS. 3 and 4, phototransistors PHT, one or more photo-driving lines PDL, and one or more photo-control lines PCL may be disposed between two corresponding gate lines GL.

In addition, referring to FIGS. 3 and 4, the non-active area N/A may include a dummy pixel area D/A in which one or more dummy subpixel rows are disposed.

The dummy pixel area D/A may be disposed on one or both sides of the active area A/A, or may be present at the entire periphery of the active area A/A.

Each of the plurality of dummy subpixels DMY_SP, included in one or more subpixel rows, may include a dummy pixel electrode DMY_PXL. In addition, each of the plurality of dummy subpixels DMY_SP may further include a driving transistor DRT.

The one or more subpixel rows are designed to be the same as the subpixel rows in the active area A/A. That is, in the one or more subpixel rows, dummy gate lines DMY_GL and the dummy pixel electrode DMY_PXL are disposed, and in some cases, dummy data lines DMY_DL may be disposed.

Here, the dummy data lines DMY_DL may be made of the same material as at least one of the data lines DL and the common electrodes COM. The dummy gate lines DMY_GL may be made of the same material as the gate lines GL.

In a driving transistor DRT, disposed in each of the plurality of dummy subpixels DMY_SP, a gate electrode may be connected to a corresponding dummy gate line DMY_GL, a source electrode (or drain electrode) may be connected to a corresponding dummy data line DMY_DL, and a drain electrode (or a source electrode) may be connected to a dummy pixel electrode DMY_PXL. The driving transistor DRT, disposed in each of the plurality of dummy subpixels DMY_SP, may perform on-off operations, or may remain in an off state constantly. A signal, applied to the dummy gate line DMY_GL, may have the same form as the scan signal SCAN applied to the active area A/A. The dummy gate line DMY_GL may be in a floating state, or may have a turned-off level voltage (e.g., a low-level voltage) constantly applied thereto.

Due to the dummy pixel area D/A disposed at the periphery of the active area A/A, effects of preventing light leakage inducing, static electricity, rubbing stain, and the like, can be expected.

In addition, in the dummy pixel area D/A in the non-active area N/A, the dummy phototransistors DMY_PHT may be disposed, and dummy photo-driving lines DMY_PDL and dummy photo-control lines DMY_PCL may also be disposed.

That is, the dummy phototransistors DMY_PHT, the dummy photo-driving lines DMY_PDL, and the dummy photo-control lines DMY_PCL may be disposed between the dummy pixel electrodes DMY_PXL or the dummy gate lines DMY_GL and the active area A/A.

In addition, referring to FIG. 3, in terms of signal supply positions, a main photo-driving line MPDL and a main photo-control line MPCL extending in a column direction (or vertical direction) should be disposed in the non-active area N/A, such that the photo-driving signal Vdrv and the photo-control signal Vsto entering the display panel DISP can be transferred to the plurality of photo-driving lines PDL and the plurality of photo-control lines PCL, disposed in a row direction (or horizontal direction), through the main photo-driving line MPDL and the main photo-control line MPCL.

The main photo-driving line MPDL disposed in the non-active area N/A is connected to the photo-driving lines PDL, disposed in the row direction (or horizontal direction), through a plurality of contact holes CNT_DRV. The main photo-control line MPCL disposed in the non-active area N/A is connected to the photo-control lines PCL, disposed in the row direction (or horizontal direction), through a plurality of contact holes CNT_STO.

Referring to FIG. 3, since the dummy subpixels DMY_SP, including the dummy pixel electrodes DMY_PXL in the non-active area N/A, are disposed closest to the active area A/A, the main photo-driving line MPDL and the main photo-control line MPCL should be disposed in areas outward of the dummy subpixels DMY_SP or the dummy data lines DMY_DL. Accordingly, the width of the non-active area N/A should be increased. That is, the presence of the dummy pixel area D/A enforces the main photo-driving line MPDL and the main photo-control line MPCL to be disposed at the periphery of the dummy pixel area D/A, thereby inevitably increasing the bezel area.

Referring to FIG. 4, in a case in which the dummy pixel area D/A is present in the non-active area N/A, the dummy data lines DMY_DL connected to the source electrode (or drain electrode) of the driving transistor DRT of each of the dummy subpixels DMY_SP may be used as the main photo-driving line MPDL and the main photo-control line MPCL, without the need for additionally disposing column-directional lines, through which the photo-driving signal Vdrv and the photo-control signal Vsto are transferred, in the non-active area N/A. This can prevent the bezel area from being increased by the main photo-driving line MPDL and the main photo-control line MPCL.

In this case, at least one of the main photo-driving line MPDL and the main photo-control line MPCL may be connected to the plurality of dummy subpixels DMY_SP. That is, at least one of the main photo-driving line MPDL and the main photo-control line MPCL may be connected to the source electrode (or drain electrode) of the driving transistor DRT included in each of the plurality of dummy subpixels DMY_SP.

In addition, in this case, the main photo-driving line MPDL and the main photo-control line MPCL may be made of the same material as the data lines DL.

Referring to FIG. 4, the photo-driving lines PDL and the photo-control lines PCL may be disposed in the same direction as the gate lines GL. The main photo-driving line MPDL and the main photo-control line MPCL may be disposed in the same direction as the data lines DL overlapping the gate lines GL.

Referring to FIGS. 3 and 4, the common electrodes COM electrically connected to the read-out lines ROL are omitted for the sake of brevity. The size of each area of the common electrodes COM may be equal to or greater than the size of the area of two subpixels SP. The structure of the common electrodes COM will be described later in more detail.

In addition, in a case in which double rate driving (DRR) able to reduce the number of channels of the data driving circuit DDC is performed, the display device according to exemplary embodiments has a structure in which a single gate line GL is disposed above each subpixel row, another single gate line GL is disposed below the same subpixel row, and two subpixel rows share a single data line DL, as illustrated in FIGS. 3 and 4.

In addition, the plurality of subpixels SP arrayed in the display panel DISP according to exemplary embodiments may be comprised of red subpixels, green subpixels, blue subpixels, and the like. According to exemplary embodiments, a red color filter (or pigment), a green color filter (or pigment), a blue color filter (or pigment), and the like, for realizing corresponding colors of light, may be disposed in each of the plurality of subpixels SP. Here, the red color filter (or pigment), the green color filter (or pigment), the blue color filter (or pigment), and the like, may be disposed on a color filter substrate, and may be disposed on a thin-film transistor (TFT) array substrate.

Here, the phototransistor PHT may be disposed to overlap an area in which each of the red color filter (or pigment), the green color filter (or pigment), and the blue color filter (or pigment) is disposed. Hereinafter, a case in which light, such as a laser beam, emitted from the beam generator BG, arrives at each of the color filters prior to a phototransistor PHT, will be described.

In a case in which light emitted from the beam generator BG has a specific color, a phototransistor PHT, the color of which is the same as or similar to the color of the light emitted from the beam generator BG, mainly responds to the light, and thus is used for photosensing.

For example, in a case in which the light emitted from the beam generator BG has a red wavelength band, the light emitted from the beam generator BG may be incident on the phototransistor PHT overlapping each of the red color filter (or pigment), the green color filter (or pigment), and the blue color filter (or pigment) by passing through each of the red color filter (or pigment), the green color filter (or pigment), and the blue color filter (or pigment). At this time, the red phototransistor PHT disposed to overlap the red color filter mainly responds to the light, thereby generating a leakage current. However, the phototransistors, disposed to the green color filter and the blue color filter, generate smaller amounts of leakage currents, due to having lower photoresponsivity. This is because light in the red wavelength band has less ability to pass through the green color filter or the blue color filter. Accordingly, in a case in which light incident on the pointed area of the display panel is in the red wavelength band, one or more phototransistors PHT overlapping the red color filter may be used to mainly respond to the light to generate a leakage current, which may be used for photosensing, and determine the light-illuminated position according to the photosensing.

Figure 5:
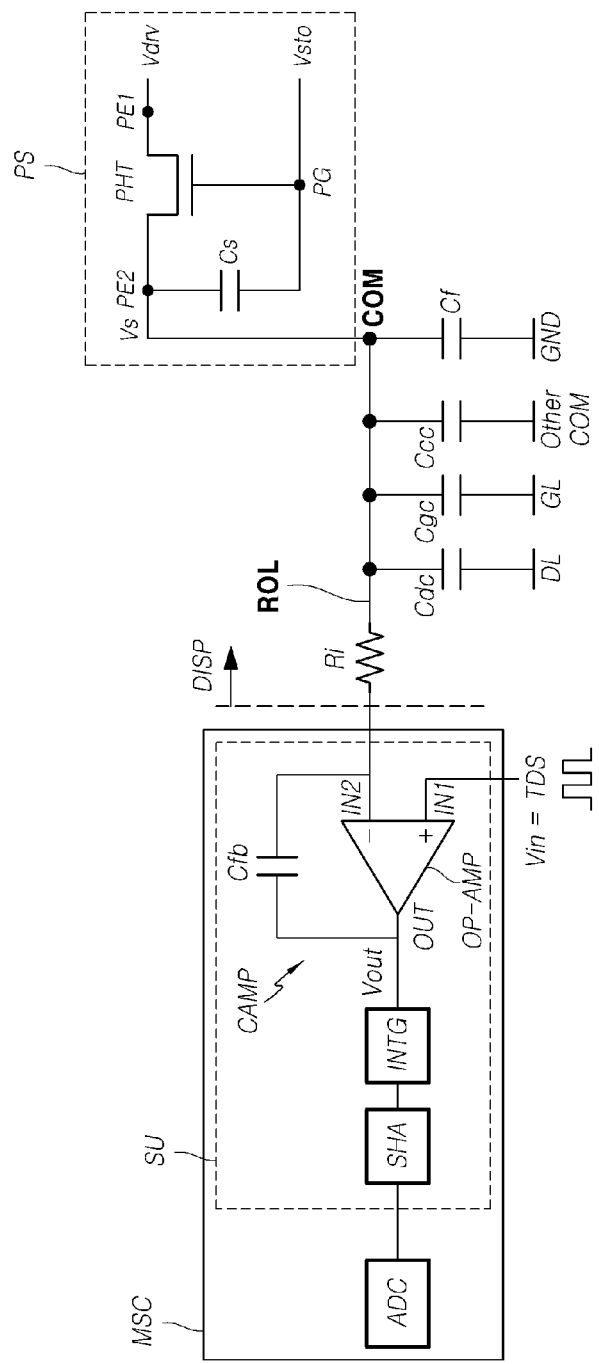
FIG. 5 is a circuit diagram illustrating a multi-sensing system according to exemplary embodiments.
Figure 6:
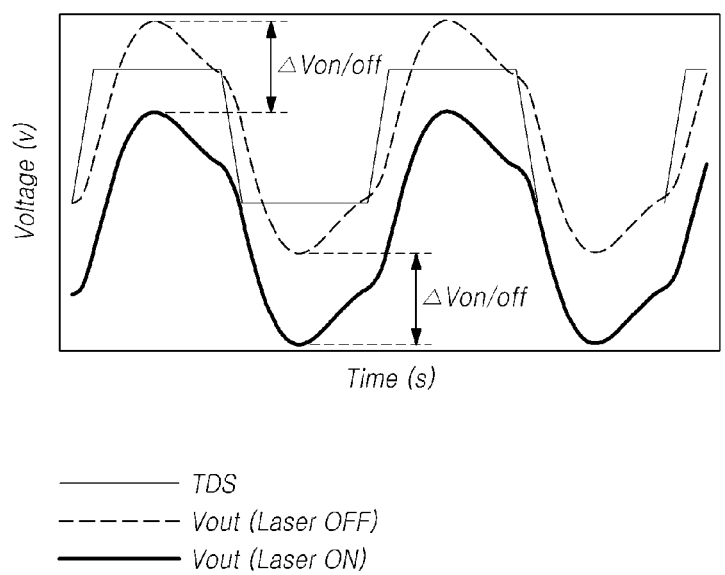
FIG. 6 is a graph illustrating a signal output from the phototransistor, depending on whether or not light is illuminated, in the display device according to exemplary embodiments.

FIG. 5 is a circuit diagram illustrating a multi-sensing system according to exemplary embodiments, and FIG. 6 is a graph illustrating a signal output from the phototransistor PHT, depending on whether or not light is illuminated, in the display device according to exemplary embodiments.

Referring to FIG. 5, the multi-sensing system according to exemplary embodiments may include a photosensor PS including a phototransistor PHT or the like, a common electrode COM serving as a touch sensor, a multi-sensing circuit MSC detecting the photosensor PS and the common electrode COM, and the like.

The photosensor PS is connected to the common electrode COM, and the common electrode COM is connected to the multi-sensing circuit MSC through a read-out line ROL. Thus, the read-out line ROL is a shared line that the multi-sensing circuit MSC uses to detect the photosensor PS and the common electrode COM.

The multi-sensing circuit MSC may include a plurality of sensors SU and one or more analog-to-digital converters ADC.

Each of the plurality of sensors SU may include a charge amplifier CAMP, an integrator INTG outputting an integrated value by integrating an output signal Vout of the charge amplifier CAMP, a sample-and-hold circuit SHA storing the integrated value of the integrator INTG.

The charge amplifier CAMP may include a first input end IN1, to which the touch driving signal TDS is input as an input signal Vin, a second input end IN2 connected to a first multiplexer MUX1, an operation amplifier OP-AMP having an output end OUT outputting an output signal Vout, a feedback capacitor Cfb connected between the second input end IN2 and the output end OUT, and the like. The first input end IN1 may be a non-inversion input end, and the second input end IN2 may be an inversion input end.

The multi-sensing circuit MSC may further include a first multiplexer selectively connecting one or more common electrodes COM among the plurality of common electrodes COM to the plurality of sensors SU, a second multiplexer connecting one or more sensors SU among the plurality of sensors SU to the analog-to-digital converters ADC, and the like.

First, touch sensing will be described. In the event of a touch, the multi-sensing circuit MSC may detect at least one of the touch and touch coordinates by detecting a variation in finger capacitance Cf of each of the common electrodes COM.

The multi-sensing circuit MSC may detect an increase in load (or an increase in Cf) due to the finger capacitance Cf, according to a voltage difference Vout-Vin between the touch driving signal TDS, applied to the common electrodes COM serving as the touch sensors (or touch electrodes), and the output signal Vout of the charge amplifier CAMP.

The multi-sensing circuit MSC outputs sensing data by converting a voltage difference Vout-Vin, accumulated using the integrator INTG in a touch sensing period, into a digital sensing value using the analog-to-digital converter ADC. The multi-controller MCTR can detect the touch using the sensing data.

Subsequently, photosensing will be described.

In the photosensing according to exemplary embodiments, when the phototransistor PHT in a turned-off state is illuminated with light, a leakage current (or an off-current) is generated by the phototransistor PHT due to the photoresponse thereof, and a quantity of electricity charged in the photocapacitor Cs due to the generation and increase of the leakage current can be detected using the voltage difference Vout-Vin between the touch driving signal TDS, applied to the common electrode COM, and the output signal Vout of the charge amplifier CAMP. Here, the photocapacitor Cs may be absent. Even in the case the photocapacitor Cs is absent, electricity can be charged due to the capacitance component of the second electrode PE2 of the phototransistor PHT.

For the photosensing, the phototransistor PHT should remain in the turned-off state. Thus, the photo-control signal Vsto applied to the gate electrode GP of the phototransistor PHT has a turn-off-level voltage by which the phototransistor PHT can be turned off.

Both the touch sensing and the photosensing commonly use the common electrodes COM and the read-out lines ROL. In addition, the multi-sensing circuit MSC performs the touch sensing and photosensing by detecting an electrical state (e.g., a charge or capacitance) of the common electrode COM through the read-out line ROL. The read-out line ROL is a signal line shared for the touch sensing and the photosensing.

In the photosensing, the output signal Vs of the phototransistor PHT is combined with a reference voltage (in the form of a pulse), thereby producing the voltage difference Vout-Vin for the photosensing. Here, the reference voltage is a pulse voltage that is not changed by the touch or phototransistor PHT, and is the same as both the input signal Vin corresponding to the touch driving signal TDS and the output value Vout of the charge amplifier CAMP (voltage difference=0).

FIG. 6 illustrates a simulation result of the sensing performed using a laser beam as illumination light in an environment in which the second electrodes PE2 of about 70 phototransistors PHT are connected to a single common electrode COM.

Referring to FIG. 6, in the case of laser sensing, the center value of the output signal Vout of the charge amplifier CAMP moves downward, in response to a laser being turned on and off.

When a leakage current (or off-current) is generated in the phototransistors PHT due to the laser illumination, electric charges enter the second input end IN2 of the operation amplifier OP-AMP in the sensor SU and are then accumulated by a feedback capacitor Cfb, thereby raising electric potential. In this case, the second input end IN2 is an inversion input end, in the point of view of the operation amplifier OP-AMP. That is, when the electric potential is raised due to the leakage current (or off-current), the overall values of the output signal Vout may consequently be lowered, as illustrated in FIG. 6.

Accordingly, as illustrated in FIG. 6, the voltage level of the output signal Vout, in the case of light illumination, is lowered from the output signal Vout, in the case in which no light illumination, by ΔVon/off.

However, since the output signal Vout, in the case of light illumination, does not affect the gain of the operation amplifier OP-AMP, like the finger capacitance Cf for the touch sensing, the center value of the output signal Vout is moved downward on the graph while the amplitude of the output signal Vout remains the same.

Accordingly, the output signal Vout in the case of light illumination and the output signal Vout in the case of no light illumination have the same or similar signal waveforms (e.g., frequencies, phases, or amplitudes). The output signal Vout in the case of light illumination and the output signal Vout in the case of no light illumination have the same signal waveform as the touch driving signal TDS.

Returning to FIG. 5, when the touch driving signal TDS is applied to the common electrode COM during the multi-sensing driving period, the common electrode COM may generate parasitic capacitance Cdc, Cgc, and Ccc together with the data lines DL, the gate lines GL, and the remaining common electrodes COM in the display panel DISP. Such parasitic capacitance Cdc, Cgc, and Ccc is reasons of lowering touch sensitivity.

Accordingly, the display device according to exemplary embodiments may perform load-free driving (LFD) to prevent the parasitic capacitance Cdc, Cgc, and Ccc from being generated between the common electrode COM and the other patterns, such as DL, GL, and other COM, in the display panel DISP when the touch driving signal TDS is applied to the common electrode COM.

In the load-free driving, an LFD signal the same as or similar to the touch driving signal TDS applied to the common electrode COM may be applied to the other patterns, such as DL, GL, and other COM, in the display panel DISP. The LFD signal corresponds to one or more of the frequency, phase, and amplitude ΔV of the touch driving signal TDS. Accordingly, the potential difference between the common electrode COM and the other patterns, such as DL, GL, and other COM, in the display panel DISP can be removed, thereby preventing the parasitic capacitance Cdc, Cgc, and Ccc.

Figure 7:
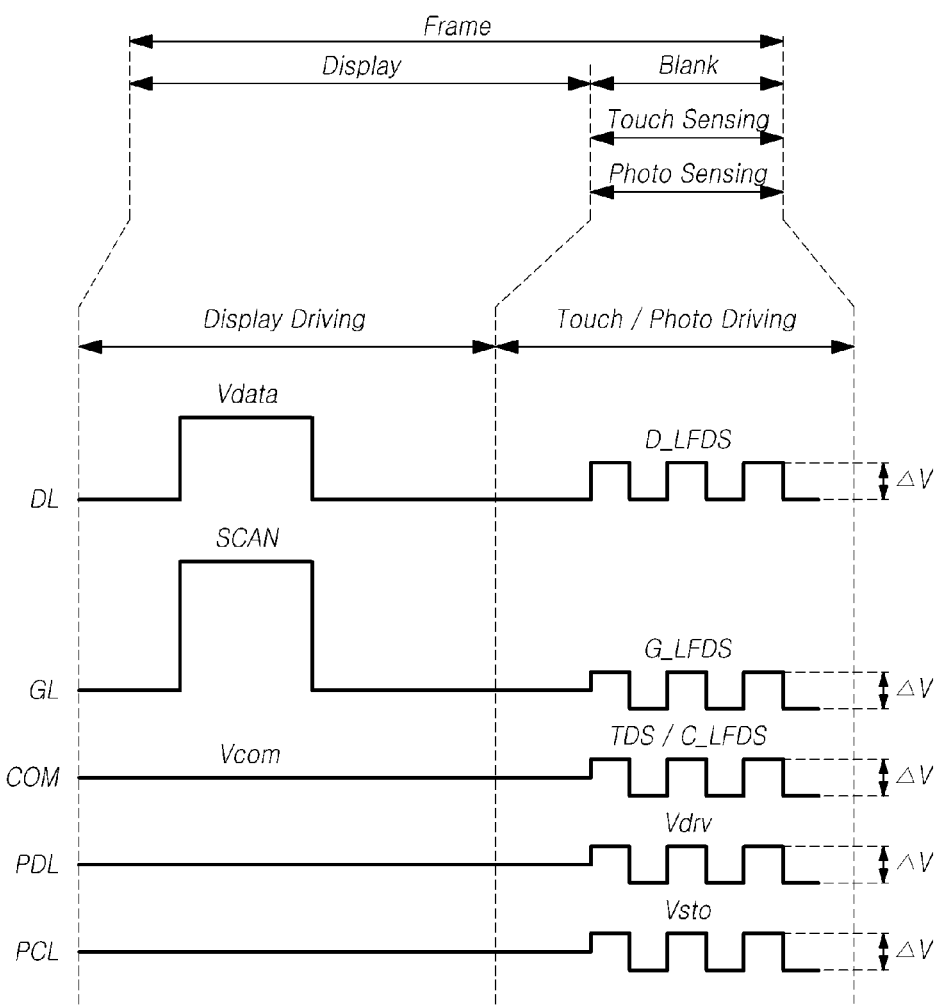
FIG. 7 is a driving timing diagram of the display device according to exemplary embodiments.

FIG. 7 is a driving timing diagram of the display device according to exemplary embodiments.

Referring to FIG. 7, the display device according to exemplary embodiments may perform display driving and multi-sensing touch sensing and photosensing) in different periods of time.

For example, during a one-frame period, the display driving may be performed during an active period, while the multi-sensing may be performed during a blank period. During the blank period, the touch sensing and the photosensing are simultaneously performed.

Referring to FIG. 7, during the display driving period, the data signal Vdata may be applied to the data lines DL, the scan signal SCAN may be applied to the gate lines GL, and the common voltage Vcom may be applied to all of the common electrodes COM.

In addition, during the display driving period, the photo-driving lines PDL and the photo-control lines PCL may be floated, or may be supplied with the common voltage Vcom, the ground voltage, or a voltage having no effect on the display driving-related lines or electrodes.

In other words, during the display driving period, the photo-driving circuit PDC outputs the common voltage Vcom, having a certain voltage level, to the plurality of common electrodes COM through the plurality of read-out lines ROL. The photo-driving circuit PDC floats the photo-driving lines PDL and the photo-control lines PCL, or outputs the photo-driving signal Vdrv and the photo-control signal Vsto having a certain voltage level to the photo-driving lines PDL and the photo-control lines PCL. Here, during the display driving period, the photo-driving signal Vdrv and the photo-control signal Vsto having a certain voltage level may be the same as, for example, the common voltage in the form of a direct current (DC) voltage.

Referring to FIG. 7, during the blank period subsequent to the display driving period, the touch driving for the touch sensing and the photo-driving for the photosensing are simultaneously performed.

During the blank period, the multi-sensing circuit MSC outputs the touch driving signal TDS, the voltage level of which swings, to the plurality of common electrodes COM through the plurality of read-out lines ROL, for the touch sensing.

During the blank period, the photo-driving circuit PDC outputs the photo-driving signal Vdrv and the photo-control signal Vsto, the voltage level of which swings, to the photo-driving lines PDL and the photo-control lines PCL, for the touch sensing.

During the blank period, the photo-driving signal Vdrv and the photo-control signal Vsto may correspond to at least one of the frequency, phase, and amplitude $\Delta V$ of the touch driving signal TDS.

Due to such similarities in signal characteristics, the photo-driving signal Vdrv and the photo-control signal Vsto also serve as an LFD signal. That is, unnecessary parasitic capacitance may not be generated between the photo-driving lines PDL or the photo-control lines PCL and the common electrodes COM.

Since the photosensing uses a leakage current generated from the phototransistor PHT in response to light illumination in a state in which the phototransistor PHT is turned off, the highest voltage level of the photo-control signal Vsto should not be raised to a level, at which the phototransistor PHT is turned on, during the blank period, despite the swinging of the voltage level of the photo-control signal Vsto.

Accordingly, during the blank period, the photo-control signal Vsto may swing within a turn-off voltage range in which the phototransistor PHT is turned off.

Herein, the touch driving signal TDS, the photo-driving signal Vdrv, and the photo-control signal Vsto, the voltage level of which is variable, may be referred to as an AC (alternating current) signal, a modulation signal, a pulse signal, or the like.

In addition, during the blank period, an LFD signal D_LFDS may be applied to the data lines DL for the low-frequency driving of the data lines DL. At least one of the frequency, phase, amplitude $\Delta V$, and the like, of the LFD signal D_LFDS corresponds to that of the touch driving signal TDS.

In addition, during the blank period, an LFD signal G_LFDS may be applied to the gate lines GL for the low-frequency driving of the gate lines GL. At least one of the frequency, phase, amplitude $\Delta V$, and the like, of the LFD signal G_LFDS corresponds to that of the touch driving signal TDS.

In addition, during the blank period, for the low-frequency driving of the common electrodes COM, an LFD signal C_LFDS may be applied to common electrodes COM, among the plurality of common electrodes COM, which are not supposed to be sensed. At least one of the frequency, phase, amplitude $\Delta V$, and the like, of the LFD signal C_LFDS, corresponds to that of the touch driving signal TDS applied to common electrodes COM, among the plurality of common electrodes COM, to be detected.

Figure 14:
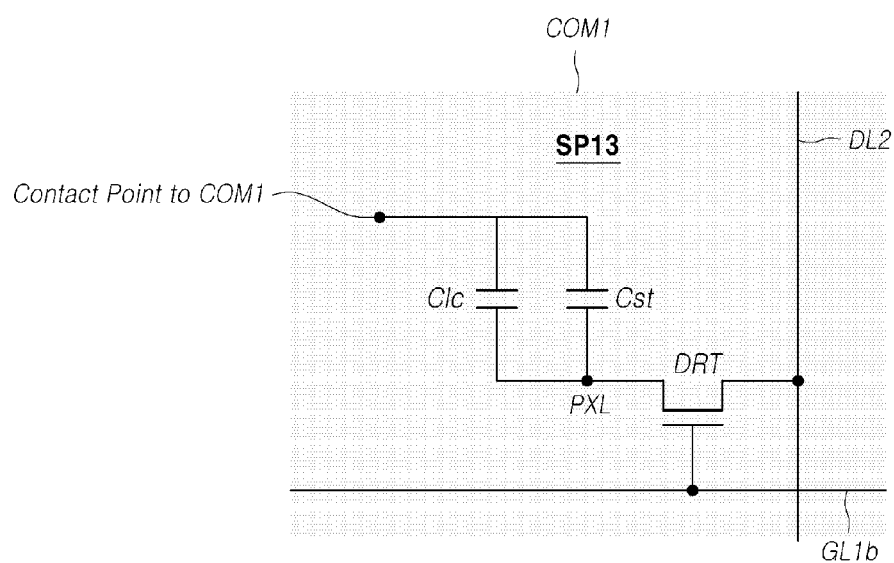
FIG. 14 illustrates a subpixel circuit of the display panel according to exemplary embodiments.
Figure 15:
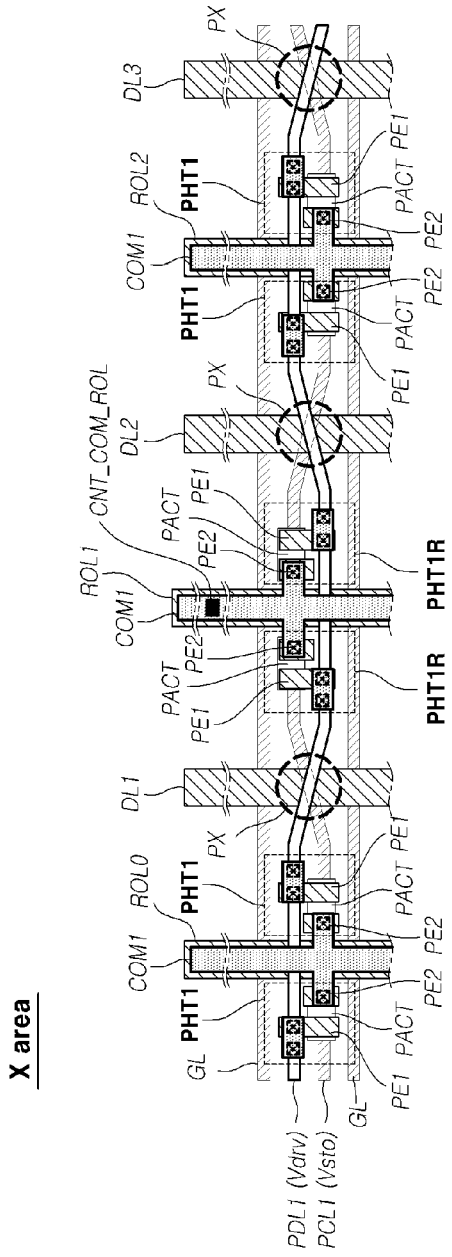
FIG. 15 illustrates an overlap structure of the photo-driving line and the photo-control line in the display panel DISP according to exemplary embodiments.

FIGS. 8 to 13 illustrate layouts of the multi-sensing lines PDL and PCL in the display panel DISP according to exemplary embodiments. FIG. 14 illustrates a subpixel circuit of the display panel DISP according to exemplary embodiments. FIG. 15 illustrates an overlap structure of the photo-driving line PDL and the photo-control line PCL in the display panel DISP according to exemplary embodiments.

FIGS. 8 to 13 are plan views more specifically illustrating an area in which a single first common electrode COM1, among the first and second common electrodes COM1 and COM2 illustrated in FIG. 2, is disposed. By way of example, a first subpixel row SPR1, a second subpixel row SPR2, a third subpixel row SPR3, and a fourth subpixel row SPR4 will be described as being sequentially arrayed in the area in which the first common electrode COM1 is disposed.

Referring to FIGS. 8 to 13, each of the four subpixel rows SPR1, SPR2, SPR3, and SPR4 may include five subpixels. The first subpixel row SPR1 includes SP11, SP12, SP13, SP14, and SP15, the second subpixel row SPR2 includes SP21, SP22, SP23, SP24, and SP25, the third subpixel row SPR3 includes SP31, SP32, SP33, SP34, and SP35, and the fourth subpixel row SPR4 includes SP41, SP42, SP43, SP44, and SP45.

Referring to FIG. 14, all subpixel structures will be considered, using the third subpixel SP13 included in the first subpixel row SPR1. The third subpixel SP13 may include a pixel electrode PXL and a driving transistor DRT.

The driving transistor DRT may be on-off controlled by the scan signal SCAN supplied from a second gate line GL1b, and be connected between a second data line DL2 and a pixel electrode PXL. During the display driving period, when the driving transistor DRT is turned on by the scan signal SCAN, the driving transistor DRT may transfer the data signal Vdata, supplied from the second data line DL2, to the pixel electrode PXL.

Storage capacitance Cst is generated between a pixel electrode PXL, to which the data signal Vdata is applied, and a first common electrode COM1, to which the common voltage Vcom, is applied. In addition, liquid crystal capacitance Clc may be generated between a pixel electrode PXL and the first common electrode COM1, due to the liquid crystal layer.

In the entirety of the layouts illustrated in FIGS. 8 to 13, in an area in which a single first common electrode COM1 is disposed, data lines DL1, DL2, and DL3 are disposed in a column direction, and gate lines GL1a, GL1b, GL2a, GL2b, GL3a, GL3b, GL4a, GL4b, and GL5a are disposed in a row direction.

FIGS. 8 to 13 illustrate cases in which the display panel DISP has a double rate driving (DRD) structure.

In the case of the DRD structure, two subpixel columns share a single data line DL. Two gate lines correspond to a single subpixel row. That is, the two gate lines, through which the scan signal is transferred to the single subpixel row, may be disposed above and below the single subpixel row.

Hereinafter, the DRD structure of the display panel DISP will be described in brief with reference to the first subpixel row SPR1 including first to fifth subpixels SP11, SP12, SP13, SP14, and SP15, etc.

Referring to FIGS. 8 to 13, in the display panel DISP having the DRD structure, a first data line DL1, through which the data signal Vdata is sequentially transferred to a first subpixel SP11 and a second subpixel SP12, a second data line DL2, through which the data signal Vdata is sequentially transferred to a third subpixel SP13 and a fourth subpixel SP14, and a third data line DL3, through which the data signal Vdata is sequentially transferred to a fifth subpixel SP5 and a sixth subpixel (not shown), may be disposed. That is, according to the DRD structure, two subpixel rows share a single data line.

Referring to FIGS. 8 to 13, in the display panel DISP having the DRD structure, a first gate line GL1a, through which the scan signal SCAN is transferred to the second subpixel SP12 and the fourth subpixel SP14, and a second gate line GL1b, through which the scan signal SCAN is transferred to the first subpixel SP11, the third subpixel SP13, and the fifth subpixel SP15, may be disposed.

Referring to FIGS. 8 to 13, in the display panel DISP, read-out lines ROL0, ROL1, and ROL2, serving as signal detection paths (or signal sensing paths) for multi-sensing, may be disposed in the column direction. The read-out lines ROL0, ROL1, and ROL2 may be disposed parallel to the data lines DL1, DL2, and DL3.

Referring to FIGS. 8 to 13, one read-out line among the read-out lines ROL0, ROL1, and ROL2, overlapping the single first common electrode COM1, is electrically connected to the first common electrode COM1 through a contact hole CON_COM_ROL.

In the illustrations of FIGS. 8 to 13, the second read-out line ROL1 among the read-out lines ROL0, ROL1, and ROL2, passing through the area of the single first common electrode COM1, is electrically connected to the first common electrode COM1 through the contact hole CON_COM_ROL. The remaining read-out lines ROL0 and ROL2 overlap the first common electrode COM1 and pass through the area of the single first common electrode COM1 without being electrically connected to the first common electrode COM1.

Referring to FIGS. 8 to 13, a plurality of phototransistors PHT1, PHT2, and . . . may be disposed in the display panel DISP.

Each of the plurality of phototransistors PHT1, PHT2, and . . . may include a gate electrode PG to which the photo-control signal Vsto is applied, a first electrode PE1 to which the photo-driving signal Vdrv is applied, and a second electrode PE2 in contact with (connected to) the first common electrode COM1.

The first common electrode COM1 is commonly connected to the second electrodes PE2 of the entirety of the phototransistors PHT1, PHT2, and . . . disposed in the area of the first common electrode COM1.

In the read-out lines ROL0, ROL1, and ROL2 passing through the area of the first common electrode COM1, the first read-out line ROL1 is disposed between the second subpixel row (including SP12, SP22, SP32, SP42, etc.) and the third subpixel row (including SP13, SP23, SP33, SP43, etc.).

The second read-out line ROL2 is disposed between the fourth subpixel row (including SP14, SP24, SP34, SP44, etc.) and the fifth subpixel row (including SP15, SP25, SP35, SP45, etc.).

One read-out line (ROL1 in the illustrations of FIGS. 8 to 13) of the first read-out line ROL1 and the second read-out line ROL2 may be electrically connected to the first common electrode COM1, to which the second electrodes PE2 of the entirety of the phototransistors PHT1, PHT2, and . . . disposed in the area of the first common electrode COM1 are commonly connected.

The other read-out line (ROL2 in the illustrations of FIGS. 8 to 13) of the first read-out line ROL1 and the second read-out line ROL2 may not be connected to the second electrode PE2 of each of the entirety of the phototransistors PHT1, PHT2, and . . . disposed in the area of the first common electrode COM1, but may be electrically connected to a second common electrode COM2 disposed in the same column as the first common electrode COM1 in the display panel DISP while being insulated from the first common electrode COM1.

That is, each of the first read-out line ROL1 and the second read-out line ROL2 overlaps both the first common electrode COM1 and the second common electrode COM2. However, the first read-out line ROL1 of the first read-out line ROL1 and the second read-out line ROL2 is connected to the first common electrode COM1, while the second read-out line ROL2 is not connected to the first common electrode COM1.

Likewise, each of the first read-out line ROL1 and the second read-out line ROL2 overlaps both the first common electrode COM1 and second common electrode COM2. However, the second read-out line ROL2 of the first read-out line ROL1 and the second read-out line ROL2 is connected to the second common electrode COM2, while the first read-out line ROL1 is not connected to the second common electrode COM2.

The two or more data lines DL1, DL2, and DL3, which the first common electrode COM1 overlaps, and the two or more data lines DL1, DL2, and DL3, which the second common electrode COM1 overlaps, are the same data lines.

The first read-out line ROL1 and the second read-out line ROL2 may be disposed in the same direction (or the same column direction) as the overlapping two or more data lines DL1, DL2, and DL3.

Referring to FIGS. 8 to 13, a plurality of photosensor rows PSR1, PSR2, and . . . may be disposed in the display panel DISP.

Referring to FIGS. 8 to 13, each of the plurality of photosensor rows PSR1, PSR2, and . . . may include phototransistors PHT and a photo-driving line PDL and a photo-control line PCL, through which the photo-driving signal Vdrv and the photo-control signal Vsto are transferred to the phototransistors PHT.

Referring to FIGS. 8 to 13, the areas, in which the plurality of subpixel rows SPR1, SPR2, SPR3, SPR4, and . . . are disposed, correspond to open areas OA. However, the areas, in which the plurality of photosensor rows PSR1, PSR2, and . . . are disposed, correspond to non-open areas NOA.

With increases in the number of the plurality of photosensor rows PSR1, PSR2, and . . . in the display panel DISP, photosensing performance may be further improved. However, the open areas OA may be reduced, thereby lowering transmittance and image quality.

In this regard, a photosensor arrangement structure able to improve photosensing performance without a significant increase in the open areas OA is desirable. Hereinafter, the photosensor arrangement structure will be described from this perspective.

As illustrated in FIGS. 8 to 13, the number, positions, and the like of the plurality of photosensor rows PSR1, PSR2, and . . . may be changed. That is, the number, positions, and the like of the phototransistors PHT1, PHT2, and . . . may be changed. The number, positions, and the like of the photo-driving lines PDL1, PDL2, and . . . and the photo-control lines PCL1, PCL2, and . . . may be changed.

Figure 8:
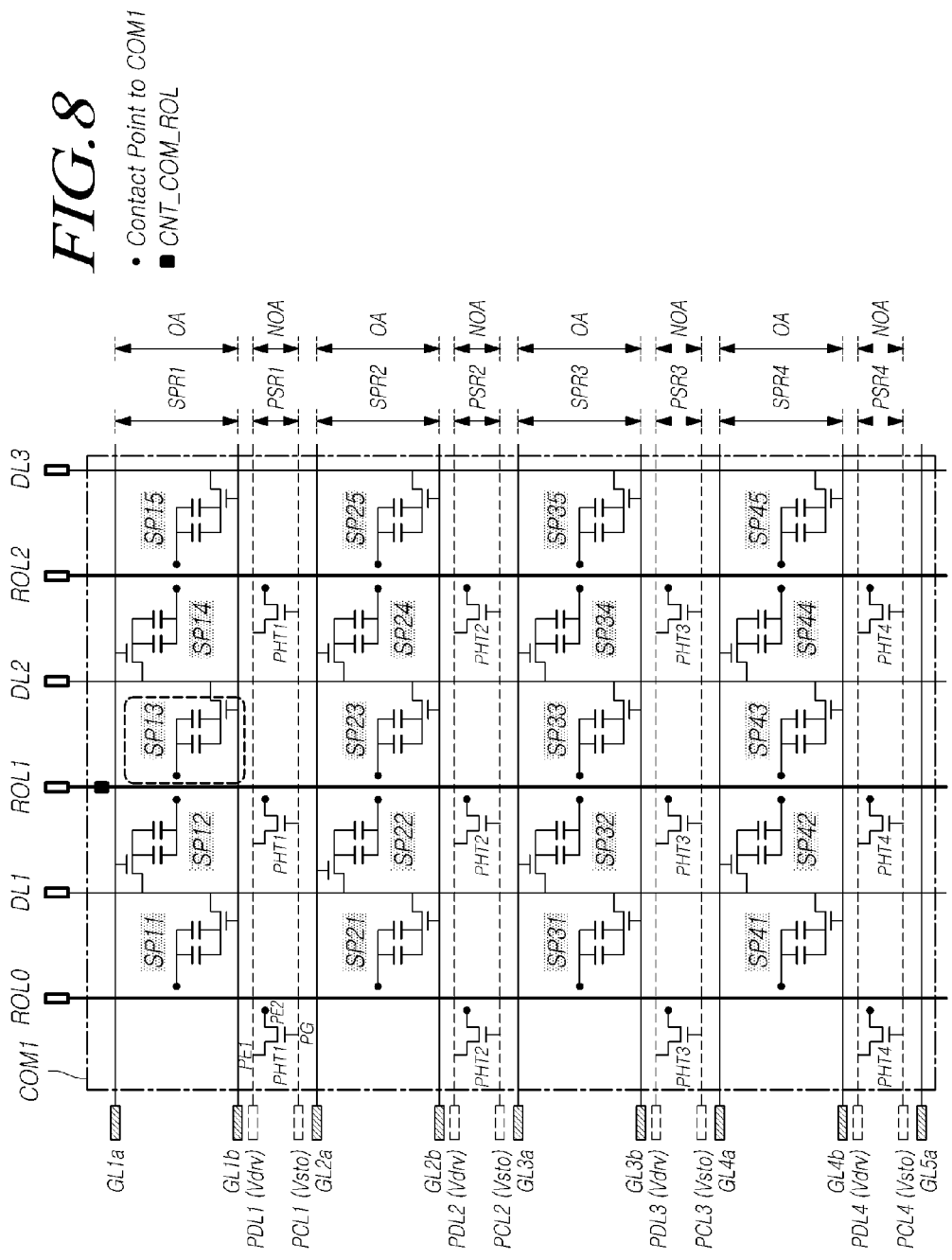
FIGS. 8 to 13 illustrate layouts of the multi-sensing lines PDL and PCL in the display panel according to exemplary embodiments.
Figure 9:
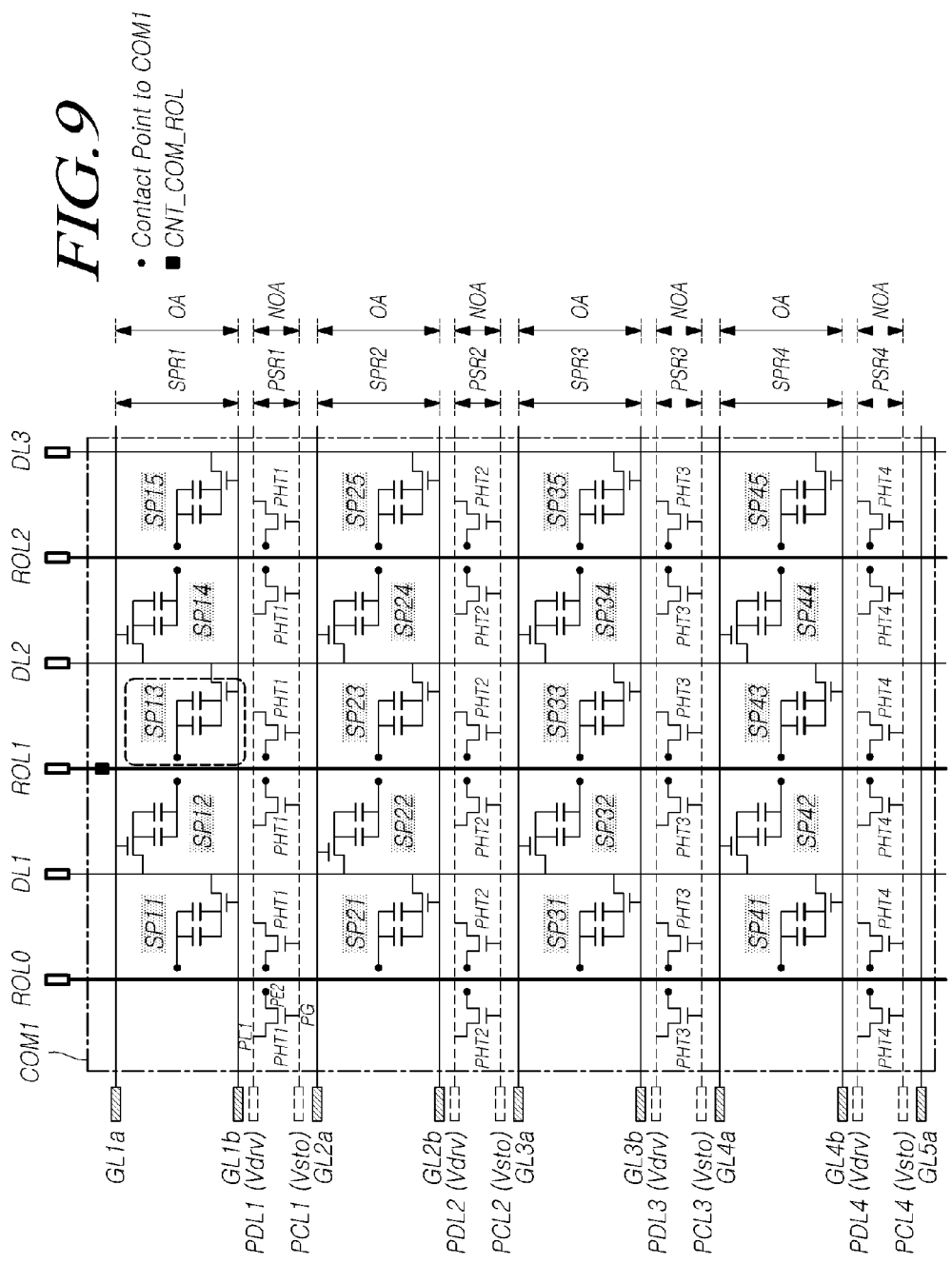

In the case of a first arrangement structure in FIG. 8 and a second arrangement structure in FIG. 9, a single photosensor row is disposed between every two subpixel rows. That is, a first photosensor row PSR1 is disposed between the first subpixel row SPR1 and the second subpixel row SPR2, a second photosensor row PSR2 is disposed between the second subpixel row SPR2 and the third subpixel row SPR3, a third photosensor row PSR3 is disposed between the third subpixel row SPR3 and the fourth subpixel row SPR4, and a fourth photosensor row PSR1 is disposed between the fourth subpixel row SPR4 and the fifth subpixel row.

More specifically, according to the first and second arrangement structures illustrated in FIGS. 8 and 9, first phototransistors PHT1, and a first photo-driving line PDL1 and a first photo-control line PCL1, through which the photo-driving signal Vdrv and the photo-control signal Vsto are transferred to the first electrode PE1 and the gate electrode PG of each of the first phototransistors PHT1, may be disposed between the first subpixel row SPR1 and the second subpixel row SPR2.

Second phototransistors PHT2, and a second photo-driving line PDL2 and a second photo-control line PCL2, through which the photo-driving signal Vdrv and the photo-control signal Vsto are transferred to the first electrode PE1 and the gate electrode PG of each of the second phototransistors PHT2, may be disposed between the second subpixel row SPR2 and the third subpixel row SPR3.

Third phototransistors PHT3, and a third photo-driving line PDL3 and a third photo-control line PCL3, through which the photo-driving signal Vdrv and the photo-control signal Vsto are transferred to the first electrode PE1 and the gate electrode PG of each of the third phototransistors PHT3, may be disposed between the third subpixel row SPR3 and the fourth subpixel row SPR4.

Fourth phototransistors PHT4, and a fourth photo-driving line PDL4 and a fourth photo-control line PCL4, through which the photo-driving signal Vdrv and the photo-control signal Vsto are transferred to the first electrode PE1 and the gate electrode PG of each of the fourth phototransistors PHT4, may be disposed between the fourth subpixel row SPR4 and the fifth subpixel row.

In the first arrangement structure illustrated in FIG. 8, a single phototransistor is allocated to every two subpixels. In contrast, in the second arrangement structure illustrated in FIG. 9, a single phototransistor is allocated to every single subpixel.

Thus, the density of the phototransistors PHT in the second arrangement structure illustrated in FIG. 9 is about twice the density of the phototransistors PHT in the first arrangement structure illustrated in FIG. 8. Accordingly, the second arrangement structure illustrated in FIG. 9 can obtain much higher photosensing performance than the first arrangement structure illustrated in FIG. 8.

In the first arrangement structure illustrated in FIG. 8 and the second arrangement structure illustrated in FIG. 9, since a single photosensor row is disposed between every two subpixel rows, image quality may be lowered due to the reduced aperture ratio and resultant decreases in transmittance.

The third to sixth arrangement structures illustrated in FIGS. 10 to 13 are arrangement structures able to improve transmittance characteristics by minimizing the reduction of the aperture ratio.

Figure 10:
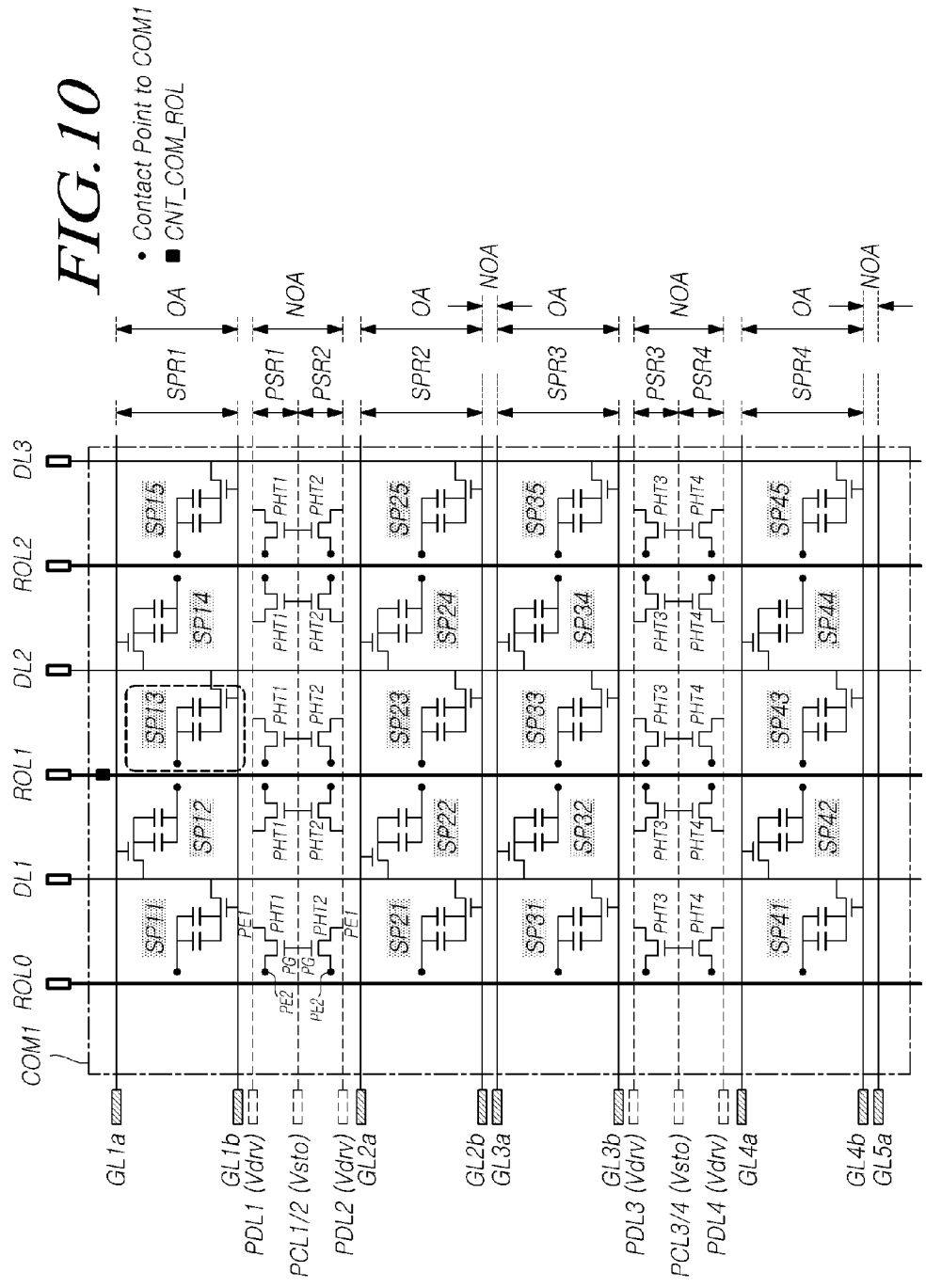
Figure 11:
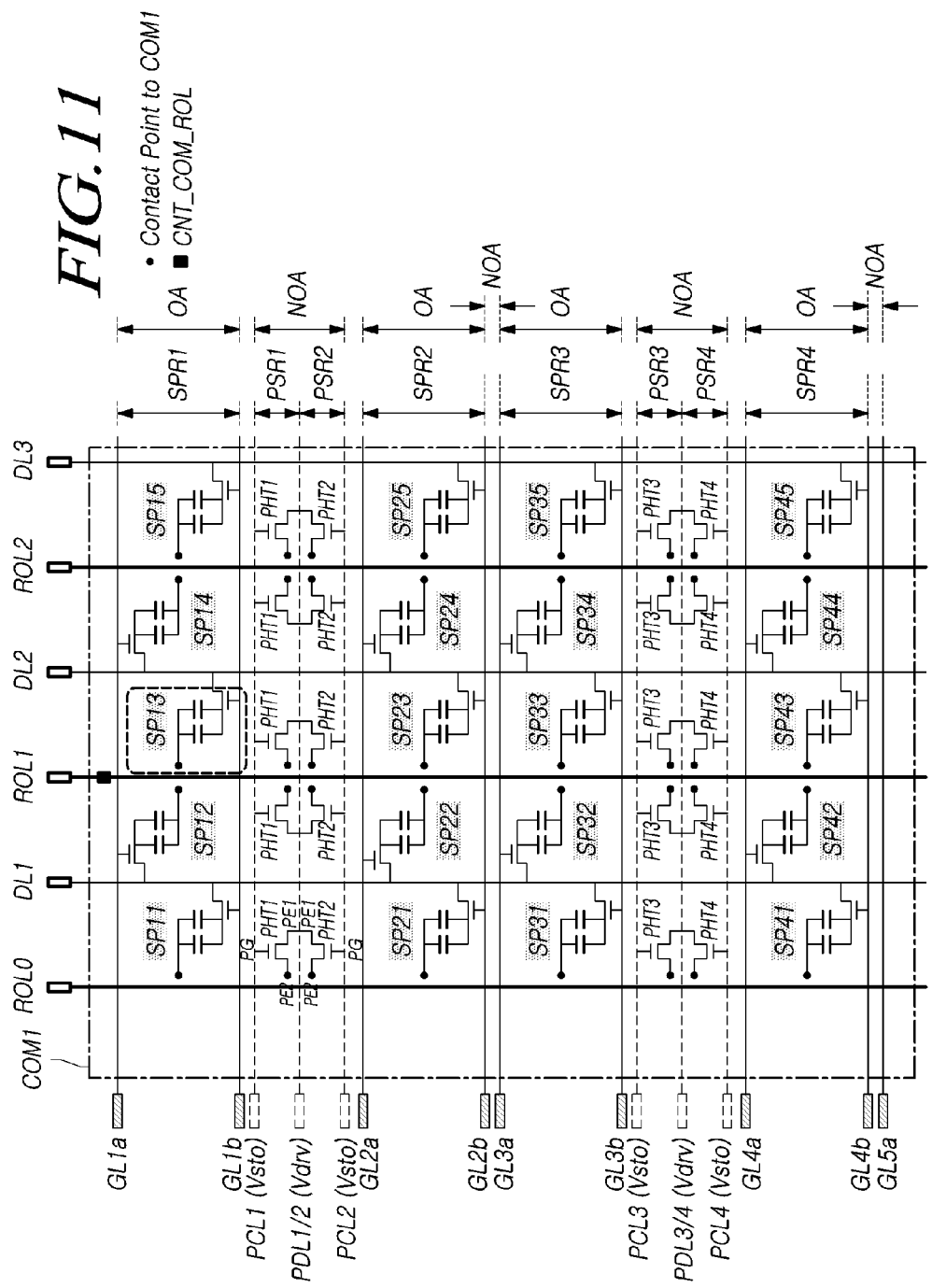

In each of the third arrangement structure illustrated in FIG. 10 and the fourth arrangement structure illustrated in FIG. 11, two photosensor rows (e.g., PSR1 and PSR2) are disposed between two subpixel rows (e.g., SPR1 and SPR2).

Thus, according to the third arrangement structure illustrated in FIG. 10 and the fourth arrangement structure illustrated in FIG. 11, a photosensor row is not present between every two subpixel rows. No photosensor row may be present between two subpixel rows (e.g., SPR2 and SPR3).

When the two photosensor rows (e.g., PSR1 and PSR2) are collected between the two subpixel rows (e.g., SPR1 and SPR2), the two photosensor rows (e.g., PSR1 and PSR2) should have two photo-driving lines (PDL for PSR1 and PDL for PSR2) and two control-photo lines (PDL for PSR1 and PDL for PSR2).

However, in the third arrangement structure illustrated in FIG. 10 and the fourth arrangement structure illustrated in FIG. 11, the aperture ratio can be increased by sharing the photosensing-related lines PDL and PCL.

The third arrangement structure illustrated in FIG. 10 is a structure sharing the photo-control lines PCL, while the fourth arrangement structure illustrated in FIG. 11 is a structure sharing the photo-driving lines PDL.

Referring to FIG. 10, according to the third arrangement structure, the first phototransistors PHT1 and the second phototransistors PHT2 may be disposed between the first subpixel row SPR1 and the second subpixel row SPR2. The third phototransistors PHT3 and the fourth phototransistors PHT4 may be disposed between the third subpixel row SPR3 and the fourth subpixel row SPR4.

However, none of the phototransistors PHT, the photo-driving lines PDL and the photo-control lines PCL are disposed between the second subpixel row SPR2 and the third subpixel row SPR3.

Accordingly, the non-open areas NOA can be reduced, thereby increasing the aperture ratio and improving transmittance.

Referring to FIG. 10, according to the third arrangement structure, the first photo-driving line PDL1, to which the first electrodes PE1 of the first phototransistors PHT1 are connected, and the second photo-driving line PDL2, to which the first electrodes PE1 of the second phototransistors PHT2 are connected, may be disposed between the first subpixel row SPR1 and the second subpixel row SPR2.

The shared photo-control line PCL1/2, to which the gate electrodes PG of the first phototransistors PHT1 and the gate electrodes PG of the second phototransistors PHT2 are commonly connected, may be disposed between the first subpixel row SPR1 and the second subpixel row SPR2.

Due to the shared photo-control line PCL1/2, the non-open areas NOA can be further reduced, thereby further increasing the aperture ratio and further improving transmittance.

Likewise, the third photo-driving line PDL3, to which the first electrodes PE1 of the third phototransistors PHT3 are connected, and the fourth photo-driving line PDL4, to which the first electrodes PE1 of the fourth phototransistors PHT4 are connected, may be disposed between the third subpixel row SPR3 and the fourth subpixel row SPR4.

The shared photo-control line PCL3/4 to which the gate electrodes PG of the third phototransistors PHT3 and the gate electrodes PG of the fourth phototransistors PHT4 are commonly connected, may be disposed between the third subpixel row SPR3 and the fourth subpixel row SPR4.

Due to the shared photo-control line PCL3/4, the non-open areas NOA can be further reduced, thereby further increasing the aperture ratio and further improving transmittance.

Referring to FIG. 11, according to the fourth arrangement structure, the first phototransistors PHT1 and the second phototransistors PHT2 may be disposed between the first subpixel row SPR1 and the second subpixel row SPR2. The third phototransistors PHT3 and the fourth phototransistors PHT4 may be disposed between the third subpixel row SPR3 and the fourth subpixel row SPR4.

However, none of the phototransistors PHT, the photo-driving lines PDL, and the photo-control lines PCL are disposed between the second subpixel row SPR2 and the third subpixel row SPR3.

Accordingly, the non-open areas NOA can be reduced, thereby increasing the aperture ratio and improving transmittance.

Referring to FIG. 11, the first photo-control line PCL1, to which the gate electrodes PG of the first phototransistors PHT1 are connected, and the second photo-control line PCL2, to which the gate electrodes PG of the second phototransistors PHT2 are connected, may be disposed between the first subpixel row SPR1 and the second subpixel row SPR2.

The shared photo-driving line PDL1/2, to which the first electrodes PE1 of the first phototransistors PHT1 and the first electrode PE1 of the second phototransistors PHT2 are commonly connected, may be disposed between the first subpixel row SPR1 and the second subpixel row SPR2.

Due to the shared photo-driving line PDL1/2, the non-open areas NOA can be further reduced, thereby further increasing the aperture ratio and further improving transmittance.

Likewise, the third photo-control line PCL3, to which the gate electrodes PG of the third phototransistors PHT3 are connected, and the fourth photo-control line PCL4, to which the gate electrodes PG of the fourth phototransistors PHT4 are connected, may be disposed between the third subpixel row SPR3 and the fourth subpixel row SPR4.

The shared photo-driving line PDL3/4, to which the first electrodes PE1 of the third phototransistors PHT3 and the first electrode PE1 of the fourth phototransistors PHT4 are commonly connected, may be disposed between the third subpixel row SPR3 and the fourth subpixel row SPR4.

Due to the shared photo-driving line PDL3/4, the non-open areas NOA can be further reduced, thereby further increasing the aperture ratio and further improving transmittance.

Subsequently, the fifth arrangement structure illustrated in FIG. 12 and the sixth arrangement structure illustrated in FIG. 13 will be described.

Figure 12:
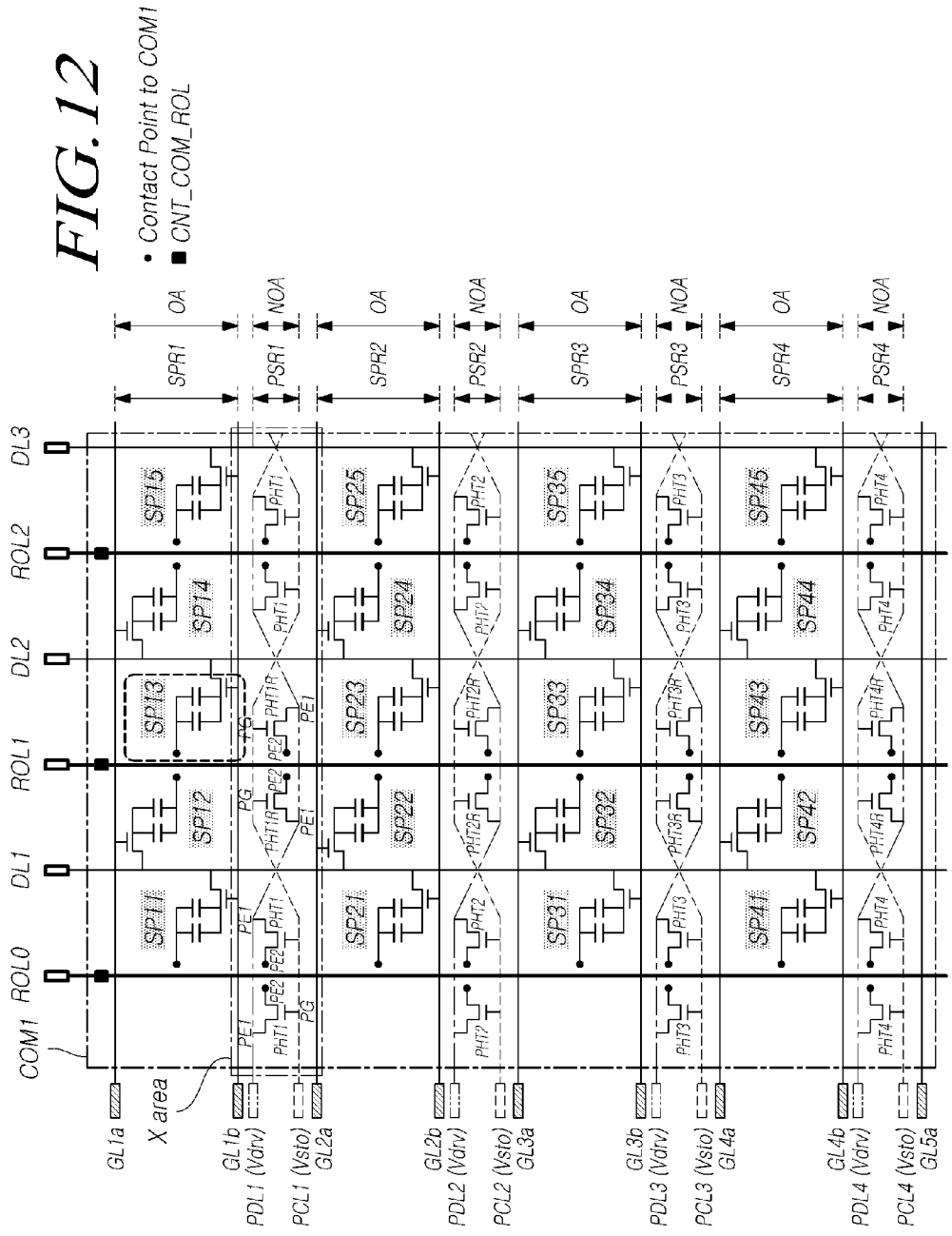
Figure 13:
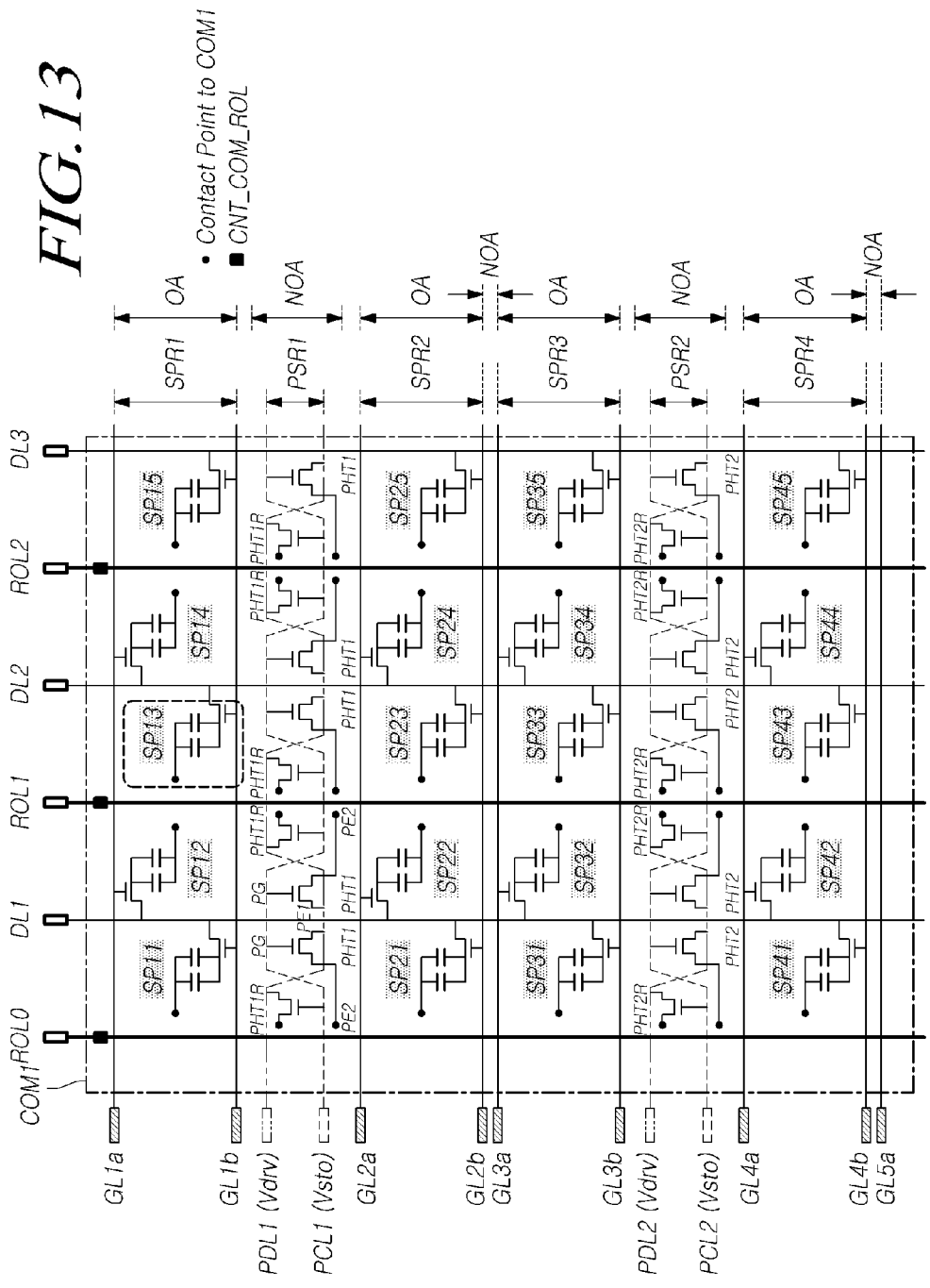

The fifth arrangement structure illustrated in FIG. 12 and the sixth arrangement structure illustrated in FIG. 13 are configured such that every two phototransistors PHT are reversed from (e.g., the position or structure of) the previous two phototransistors PHT. In addition, the photo-driving lines PDL overlap the photo-control lines PCL at one or more points of overlap PX.

In the case of the fifth arrangement structure illustrated in FIG. 12 and the sixth arrangement structure illustrated in FIG. 13, due to the reversed arrangement of the phototransistors PHT, a designed space can be easily obtained, and the phototransistor PHT can be more densely disposed in a more concentrated manner. Accordingly, it is possible to reduce the non-open areas NOA, and thus, improve transmittance.

Referring to the fifth arrangement structure illustrated in FIG. 12, each of photosensor rows PSR1, PSR2, PSR3, and PSR4 is allocated to a single subpixel row.

In the fifth arrangement structure, the first photosensor row PSR1 is disposed between the first subpixel row SPR1 and the second subpixel row SPR2, and the second photosensor row PSR2 is disposed between the second subpixel row SPR2 and the third subpixel row SPR3. In addition, the third photosensor row PSR3 is disposed between the third subpixel row SPR3 and the fourth subpixel row SPR4, and the fourth photosensor row PSR4 is disposed between the fourth subpixel row SPR4 and the fifth subpixel row.

More specifically, the first phototransistors PHT1 and PHT1R, the first photo-driving line PDL1, and the first photo-control line PCL1 are disposed between the first subpixel row SPR1 and the second subpixel row SPR2, and the phototransistors PHT2 and PHT2R, the second photo-driving line PDL2, and the second photo-control line PCL2 are disposed between the second subpixel row SPR2 and the third subpixel row SPR3. In addition, the third phototransistors PHT3 and PHT3R, the third photo-driving line PDL3, and the third photo-control line PCL3 are disposed between the third subpixel row SPR3 and the fourth subpixel row SPR4, and the fourth phototransistors PHT4 and PHT4R, the fourth photo-driving line PDL4 and the fourth photo-control line PCL4 are disposed between the fourth subpixel row SPR4 and the fifth subpixel row.

Referring to the sixth arrangement structure illustrated in FIG. 13, each of photosensor rows PSR1, PSR2, PSR3, and PSR4 is allocated to two subpixel rows. Accordingly, the aperture ratio and transmittance can be further improved, compared to the fifth arrangement structure illustrated in FIG. 12.

In the sixth arrangement structure illustrated in FIG. 13, the first photosensor row PSR1 is disposed between the first subpixel row SPR1 and the second subpixel row SPR2, and no first photosensor row is disposed between the second subpixel row SPR2 and the third subpixel row SPR3. The second photosensor row PSR2 is disposed between the third subpixel row SPR3 and the fourth subpixel row SPR4, and no first photosensor row is disposed between the fourth subpixel row SPR4 and the fifth subpixel row.

More specifically, the first phototransistors PHT1 and PHT1R, the first photo-driving line PDL1, and the first photo-control line PCL1 are disposed between the first subpixel row SPR1 and the second subpixel row SPR2. However, none of the phototransistors PHT, the photo-driving line PDL, and the photo-control lines PCL are disposed between the second subpixel row SPR2 and the third subpixel row SPR3. The second phototransistors PHT2 and PHT2R, the second photo-driving line PDL2, and the second photo-control line PCL2 are disposed between the third subpixel row SPR3 and the fourth subpixel row SPR4. However, none of the phototransistors PHT, the photo-driving lines PDL, and the photo-control lines PCL are disposed between the fourth subpixel row SPR4 and the fifth subpixel row.

The number of the first phototransistors PHT1 disposed in the first photosensor row PSR1 in FIG. 13 is twice the number of the first phototransistors PHT1 disposed in the first photosensor row PSR1 in FIG. 12.

That is, the sixth arrangement structure in FIG. 13 can further improve the density of photosensor components than the fifth arrangement structure in FIG. 12 while ensuring none of the phototransistors PHT, the photo-driving lines PDL, and the photo-control lines PCL are disposed between the second subpixel row SPR2 and the third subpixel row SPR3, thereby further improving the aperture ratio and transmittance.

According to the fifth arrangement structure in FIG. 12 and the sixth arrangement structure in FIG. 13, the first photo-driving line PDL1 and the first photo-control line PCL1, disposed in the first photosensor row PSR1, overlap each other at one or more points of overlap.

According to the fifth arrangement structure in FIG. 12 and the sixth arrangement structure in FIG. 13, the first photo-driving line PDL1 and the first photo-control line PCL1 may be disposed on different material layers, despite overlapping each other, since the first photo-driving line PDL1 and the first photo-control line PCL1 are different signal transfer lines.

According to the fifth arrangement structure in FIG. 12, the points of overlap between the first photo-driving line PDL1 and the first photo-control line PCL1 are located between the first phototransistors PHT1 and the reversed first phototransistors PHT1R. In addition, the points of overlap between the first photo-driving line PDL1 and the first photo-control line PCL1 may overlap the data lines DL1, DL2, and DL3.

According to the sixth arrangement structure in FIG. 13, the points of overlap between the first photo-driving line PDL1 and the first photo-control line PCL1 are located between the first phototransistors PHT1 and the reversed first phototransistors PHT1R. In addition, a point of overlap between the first photo-driving line PDL1 and the first photo-control line PCL1 may be located between the first read-out line ROL1, electrically connected to the second electrodes PE2 of the first phototransistors PHT1 and the reversed first phototransistors PHT1R, and the first data line DL1.

The inverted structure of the phototransistors PHT in the fifth arrangement structure in FIG. 12 will be described in more detail with reference to FIG. 15. FIG. 15 is an enlargement of area X between the first subpixel row SPR1 and the second subpixel row SPR2 in FIG. 12.

Referring to FIG. 15, the first photo-driving line PDL1 and the first photo-control line PCL1 disposed in the first photosensor row PSR1 overlap each other at a plurality of points of overlap PX.

The first photo-driving line PDL1 and the first photo-control line PCL1 may be disposed on different material layers, despite overlapping each other, since the first photo-driving line PDL1 and the first photo-control line PCL1 are different signal transfer lines.

The points of overlap PX between the first photo-driving line PDL1 and the first photo-control line PCL1 are located between the first phototransistors PHT1 and the reversed first phototransistor PHT1R.

In addition, the points of overlap between the first photo-driving line PDL1 and the first photo-control line PCL1 may overlap the data lines DL1, DL2, and DL3.

Referring to FIG. 15, one of the second electrode PE2 of each first phototransistor PHT1 and the second electrode PE2 of the corresponding reversed first phototransistor PHT1R may be adjacent to the first subpixel row SPR1, while the other of the second electrodes PE2 may be adjacent to the second subpixel row SPR2. In other words, the second electrode PE2 of the reversed first phototransistor PHT1R is located closer to the first subpixel row SPR1 than the second electrode PE2 of the first phototransistors PHT1.

Referring to FIG. 15, one of the active layer PACT of the first phototransistor PHT1 and the active layer PACT of the reversed first phototransistor PHT1R may be adjacent to the first subpixel row SPR1, while the other of the active layers PACT may be adjacent to the second subpixel row SPR2. In other words, the active layer PACT of the reversed first phototransistor PHT1R may be located closer to the first subpixel row SPR1 than the active layer PACT of the first phototransistor PHT1.

Referring to FIG. 15, one of the gate electrode PG of the first phototransistor PHT1 and the gate electrode PG of the reversed first phototransistor PHT1R may be adjacent to the first subpixel row SPR1, while the other of the gate electrodes PG may be adjacent to the second subpixel row SPR2. In other words, the gate electrode PG of the reversed first phototransistor PHT1R may be located closer to the first subpixel row SPR1 than the gate electrode PG of the first phototransistors PHT1.

In FIG. 15, the gate electrodes PG of the first phototransistors PHT1 are portions located below the active layers PACT of the first phototransistors in the first photo-control line PDL1. In FIG. 15, the gate electrodes PG of the second phototransistors PHT2 are portions located below the active layers PACT of the second phototransistors PHT1R in the second photo-control line PDL2.

The above-described display panel DISP may include a lower substrate on which a variety of transistors DRT and PHT are provided and an upper substrate (e.g., a color filter substrate) located above the lower substrate.

The top surface of the display panel DISP, closer to the upper substrate, may serve as a viewing surface, a touch surface, and a light illumination surface. Alternatively, the bottom surface of the display panel DISP, closer to the lower substrate, may serve as a viewing surface, a touch surface, and a light illumination surface.

The cross-sectional structure of the above-stated phototransistor PHT will be described hereinafter.

Figure 16:
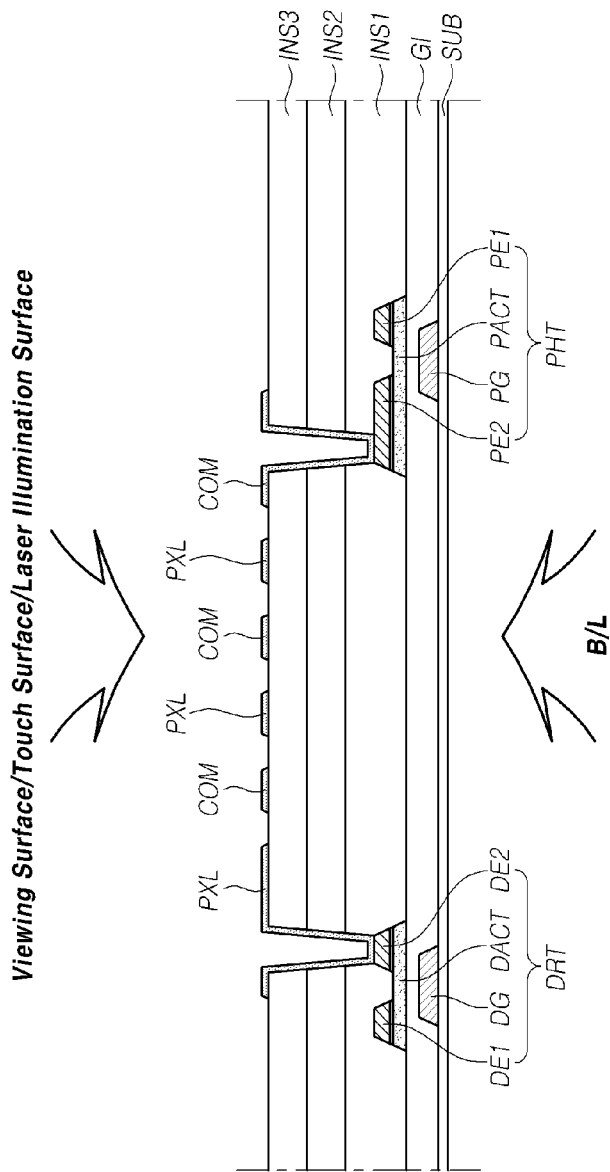
FIGS. 16 to 18 are cross-sectional views of phototransistors disposed in the display panel according to exemplary embodiments.
Figure 17:
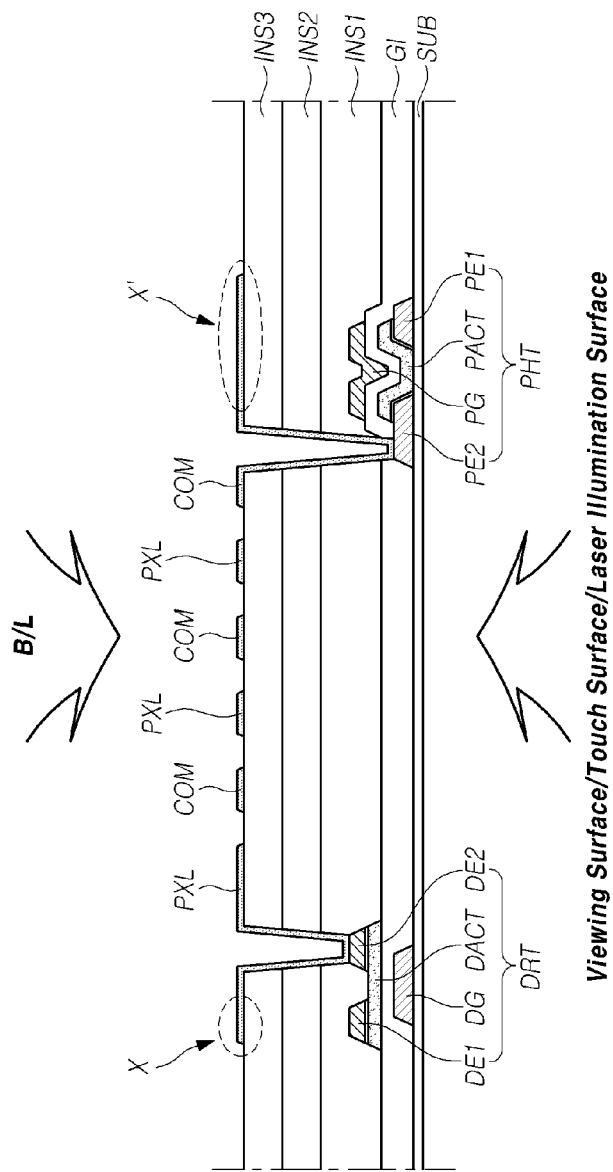
Figure 18:
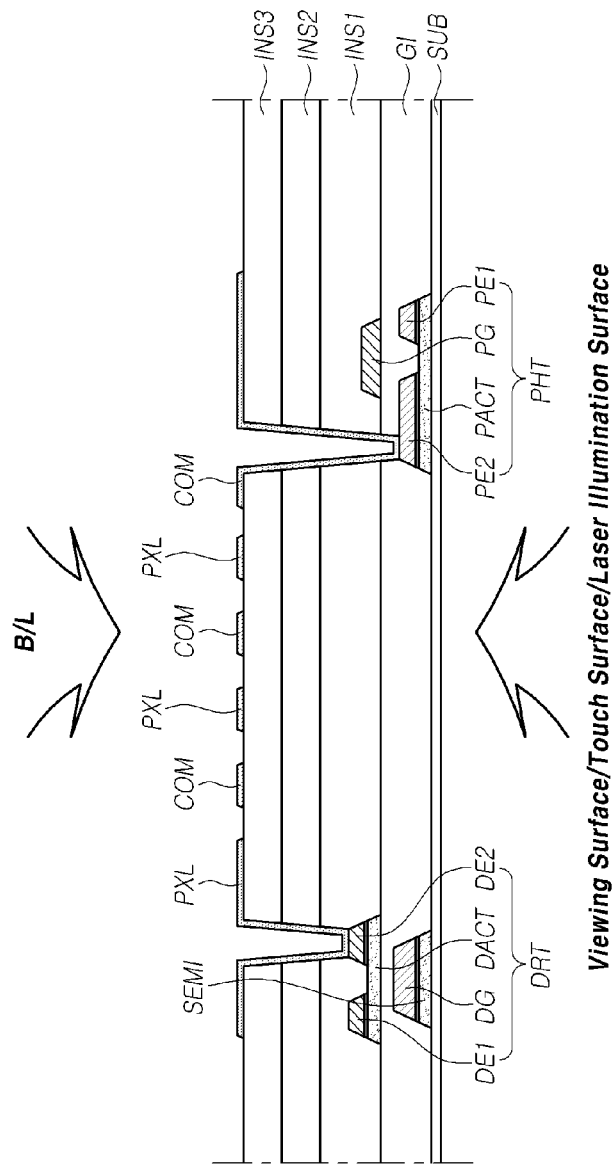

FIGS. 16 to 18 are cross-sectional views of phototransistors PHT disposed in the display panel DISP according to exemplary embodiments.

Referring to FIG. 16, an active layer DACT of a driving transistor DRT is disposed above a gate electrode DG of a driving transistor DRT.

Referring to FIG. 16, an active layer PACT of a phototransistor PHT may be located above a gate electrode PG of the phototransistor PHT. Accordingly, the active layer PACT of the phototransistor PHT may generate an off-current in response to light illuminating the top surface.

Referring to FIG. 16, both the driving transistor DRT and the phototransistor PHT have a bottom gate structure.

Referring to FIG. 16, a gate electrode DG of the driving transistor DRT and the gate electrode PG of the phototransistor PHT may be located on the same layer. The active layer DACT of the driving transistor DRT and the active layer PACT of the phototransistor PHT may be located on the same layer.

In the display panel DISP having the cross-sectional structure illustrated in FIG. 16, the top surface thereof may serve as a viewing surface, a touch surface, and a light illumination surface.

Referring to FIG. 17, an active layer DACT of a driving transistor DRT is located above a gate electrode DG of the driving transistor DRT.

Referring to FIG. 17, an active layer PACT of the phototransistor PHT may be located below a gate electrode PG of the phototransistor PHT. Accordingly, the active layer PACT of the phototransistor PHT may generate an off-current in response to light illuminating the bottom surface.

Referring to FIG. 17, the driving transistor DRT has a bottom gate structure, and the phototransistor PHT has a top gate structure.

Referring to FIG. 17, a first electrode PE1 and a second electrode PE2 of the phototransistor PHT may be located on the same layer as the gate electrode DG of the driving transistor DRT.

Referring to FIG. 17, the gate electrode PG of the phototransistor PHT may be located on the same layer as the first electrode DE1 and the second electrode DE2 of the driving transistor DRT.

Referring to FIG. 17, the active layer PACT of the phototransistor PHT may be located on a different layer from the active layer DACT of the driving transistor DRT.

In the display panel DISP having the cross-sectional structure illustrated in FIG. 17, the bottom surface thereof may serve as a viewing surface, a touch surface, and a light illumination surface.

Referring to FIG. 18, an active layer DACT of a driving transistor DRT is located above a gate electrode DG of the driving transistor DRT. A first electrode DE1 and a second electrode De2 of the driving transistor DRT may be located above the active layer DACT of the driving transistor DRT.

Referring to FIG. 18, an active layer PACT of the phototransistor PHT may be located below a gate electrode PG of the phototransistor PHT, and a first electrode PE1 and a second electrode PE2 of the phototransistor PHT may be located between the active layer PACT of the phototransistor PHT and the gate electrode PG of the phototransistor PHT. Since the active layer PACT of the phototransistor PHT is disposed below the first electrode PE1, the second electrode PE2, and the gate electrode PG, the active layer PACT can respond to light illuminating the bottom surface.

Referring to FIG. 18, the gate electrode PG of the phototransistor PHT may be made of the same material as the first electrode DE1 and the second electrode DE2 of the driving transistor DRT. The first electrode PE1 and the second electrode PE2 of the phototransistor PHT may be made of the same material as the gate electrode DG of the driving transistor DRT. The active layer PACT of the phototransistor PHT may be located on a different layer from the active layer DACT of the driving transistor DRT.

Referring to FIG. 18, a semiconductor material layer SEMI may be disposed below the gate electrode DG of the driving transistor DRT. The semiconductor material layer SEMI may be made of the same material as the active layer PACT of the phototransistor PHT.

In the display panel DISP having the cross-sectional structure illustrated in FIG. 18, the bottom surface thereof serve as a viewing surface, a touch surface, and a light illumination surface.

Hereinafter, structures of the phototransistor PHT will be described in more detail with reference to FIGS. 16 to 18.

FIG. 16 illustrates a structure of the phototransistor PHT according to exemplary embodiments, disposed on a substrate, in a case an image is displayed from the front surface of the substrate. That is, light B/L emitted from a backlight is illuminated to the rear surface of the substrate on which the phototransistor PHT is disposed.

Referring to FIG. 16, a gate electrode DG of a driving transistor DRT and a gate electrode PG of a phototransistor PHT are disposed on a substrate SUB. In addition, a gate insulating layer GI is disposed.

An active layer DACT of the driving transistor DRT and an active layer PACT of the phototransistor PHT are disposed on the gate insulating layer GI. In addition, a first electrode DE1 and a second electrode DE2 of the driving transistor DRT are disposed, and a first electrode PE1 and a second electrode PE2 of the phototransistor PHT are disposed.

That is, the phototransistor PHT may be fabricated by the same process by which the driving transistor DRT is fabricated.

One or more insulating layers may be disposed on the driving transistor DRT and the phototransistor PHT. For example, a first insulating layer INS1, a second insulating layer INS2, and a third insulating layer INS3 may be disposed. This arrangement structure of the insulating layers is merely illustrative, and a greater or smaller number of insulating layers may be disposed.

A pixel electrode PXL and a common electrode COM may be disposed on the third insulating layer INS3.

Here, the pixel electrode PXL may be electrically connected to the second electrode DE2 of the driving transistor DRT through a contact hole provided in the insulating layers. In addition, the common electrode COM may be electrically connected to the second electrode PE2 of the phototransistor PHT through a contact hole provided in the insulating layers.

Thus, the driving transistor DRT may cause the data signal Vdata, applied to the first electrode DE1 of the driving transistor DRT through a corresponding data line DL, to be applied to the pixel electrode PXL.

In addition, in a state in which the photo-control signal Vsto is applied to the gate electrode PG of the phototransistor PHT and the photo-driving signal Vdrv is applied to the first electrode PE1 of the phototransistor PHT, the phototransistor PHT may cause the output signal Vs to be output to a corresponding read-out line ROL connected to the common electrode COM, in response to the photosensing.

In a case in which the display device displays an image from the front surface of the substrate on which the phototransistor PHT is disposed, the phototransistor PHT may be easily fabricated by a process by which the driving transistor DRT is fabricated.

In contrast, in a case in which the display device displays an image from the rear surface of the substrate, the active layer PACT of the phototransistor PHT may not be exposed to external light, so that the photosensing may not be performed.

Exemplary embodiments provide a structure of the phototransistor PHT, able to improve photosensing performance in a case in which an image is displayed from the rear surface of the substrate opposing the front surface on which the phototransistor PHT is disposed.

FIG. 17 illustrates a structure of the phototransistor PHT disposed on a substrate in a case in which an image is displayed from the rear surface of the substrate. That is, light B/L emitted from a backlight is illuminated to the front surface of the substrate on which the phototransistor PHT is disposed.

Referring to FIG. 17, a gate electrode DG of a driving transistor DRT is disposed on a substrate SUB. In addition, a first electrode PE1 and a second electrode PE2 of phototransistor PHT may be disposed on the substrate SUB.

Here, the first electrode PE1 and the second electrode PE2 of phototransistor PHT may be made of the same material as the gate electrodes DG of the driving transistor DRT. That is, the first electrode PE1 and the second electrode PE2 of phototransistor PHT may be fabricated by a process by which the gate electrode DG of the driving transistor DRT is fabricated.

In addition, an active layer PACT of the phototransistor PHT may be disposed on the first electrode PE1 and the second electrode PE2 of phototransistor PHT.

A gate insulating layer GI is disposed on the gate electrode DG of the driving transistor DRT and the active layer PACT of the phototransistor PHT.

The active layer DACT of the driving transistor DRT is disposed on the gate insulating layer GI, and a first electrode DE1 and a second electrode DE2 of the driving transistor DRT are disposed on the active layer DACT. In addition, a gate electrode PG of the phototransistor PHT is disposed on the gate insulating layer GI.

Here, the gate electrode PG of the phototransistor PHT may be made of the same material as the first electrode DE1 and the second electrode DE2 of the driving transistor DRT. That is, the gate electrode PG of the phototransistor PHT may be fabricated by a process by which the first electrode DE1 and the second electrode DE2 of the driving transistor DRT are fabricated.

A first insulating layer INS1, a second insulating layer INS2, and a third insulating layer INS3 may be disposed on the first electrode DE1 and the second electrode DE2 of the driving transistor DRT.

In addition, the second electrode DE2 of the driving transistor DRT may be electrically connected to a pixel electrode PXL through a contact hole provided in the insulating layers.

In addition, the second electrode PE2 of the phototransistor PHT may be electrically connected to a common electrode COM through a contact hole provided in the insulating layers. Here, the contact hole through which the second electrode PE2 of the phototransistor PHT is connected to the common electrode COM may extend to the gate insulating layer GI.

As described above, the active layer PACT of the phototransistor PHT is disposed below the gate electrode PG of the phototransistor PHT, such that photosensing can be performed by responding to light illuminating the surface on which an image is displayed.

In addition, since light B/L emitted from the backlight is incident on the front surface of the substrate SUB, a structure for preventing an off-current from being generated in the driving transistor DRT or the phototransistor PHT in response to light B/L emitted from the backlight is provided.

For example, the pixel electrode PXL may be configured such that a portion thereof, indicated with X, overlaps the active layer DACT of the driving transistor DRT. In addition, the common electrode COM may be configured such that a portion thereof, indicated with X', overlaps the active layer PACT of the phototransistor PHT.

That is, a portion of the pixel electrode PXL or the common electrode COM, located in a direction in which light B/L emitted from the backlight is incident, may overlap the driving transistor DRT or the phototransistor PHT to prevent an off-current from being generated in the driving transistor DRT or the phototransistor PHT in response to light B/L emitted from the backlight.

FIG. 18 illustrates another structure of the phototransistor PHT disposed on a substrate in a case in which an image is displayed from the rear surface of the substrate.

Referring to FIG. 18, a semiconductor material layer SEMI and an active layer PACT of a phototransistor PHT may be disposed on a substrate SUB. In addition, a gate electrode DG of a driving transistor DRT is disposed on the semiconductor material layer SEMI. In addition, a first electrode PE1 and a second electrode PE2 of the phototransistor PHT may be disposed on the active layer PACT.

Here, the semiconductor material layer SEMI may be disposed in the process in which the active layer PACT of the phototransistor PHT is being disposed. In addition, the first electrode PE1 and a second electrode PE2 of the phototransistor PHT may be made of the same material as a gate electrode DG of the driving transistor DRT.

A gate insulating layer GI may be disposed on the gate electrode DG of the driving transistor DRT and the first electrode PE1 and the second electrode PE2 of the phototransistor PHT.

In addition, an active layer DACT of the driving transistor DRT may be disposed on the gate insulating layer GI, and a first electrode DE1 and a second electrode DE2 of the driving transistor DRT may be disposed on the active layer DACT of the driving transistor DRT.

In addition, a gate electrode PG of the phototransistor PHT may be disposed on the gate insulating layer GI. That is, the first electrode PE1 and the second electrode PE2 of the phototransistor PHT may be disposed between the active layer PACT and the gate electrode PG of the phototransistor PHT.

Here, the gate electrode PG of the phototransistor PHT may be made of the same material as the first electrode DE1 and the second electrode DE2 of the driving transistor DRT.

A first insulating layer INS1, a second insulating layer INS2, and a third insulating layer INS3 may be disposed on the driving transistor DRT and the phototransistor PHT. In addition, the second electrode DE2 of the driving transistor DRT may be electrically connected to a pixel electrode PXL through a contact hole provided in the insulating layers, and the second electrode PE2 of the phototransistor PHT may be electrically connected to a common electrode COM through a contact hole provided in the insulating layers.

As described above, since the active layer PACT of the phototransistor PHT is disposed in the lowermost portion of the phototransistor PHT, such that the active layer PACT of the phototransistor PHT can easily respond to light illuminating the surface on which an image is displayed. Accordingly, in the structure in which the display panel DISP displays an image from the rear surface of the substrate on which the phototransistor PHT is disposed, photosensing performance can be further improved.

In addition, as described above, in a case in which the common electrode COM and the pixel electrode PXL are disposed on the same layer, in the space between the common electrode COM and the second electrode DE2 of the driving transistor DRT, an area in which capacitance is to be generated may be insufficient. Accordingly, exemplary embodiments provide a solution in which a common electrode COM is additionally provided using a material disposed on a different layer from either the common electrode COM or the pixel electrode PXL, such that capacitance can be generated between the second electrode DE2 of the driving transistor DRT, to which the data signal Vdata is applied, and the common electrode COM.

Figure 19:
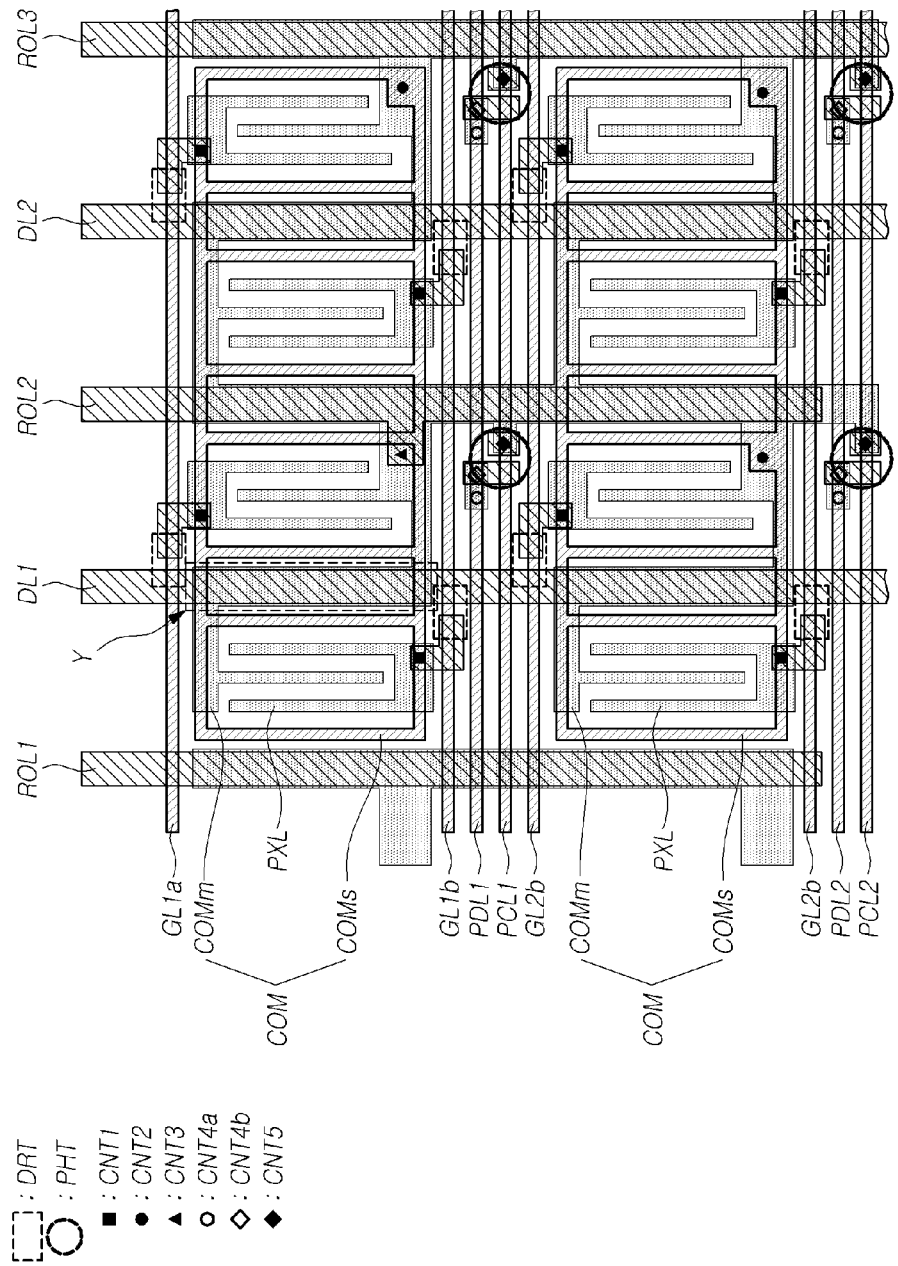
FIGS. 19 to 21 illustrate structures of the common electrodes disposed in the display panel according to exemplary embodiments.

FIG. 19 illustrates a structure of the common electrode COM disposed in the display panel DISP according to exemplary embodiments.

Referring to FIG. 19, an area corresponding to a single common electrode COM, i.e., a single touch block, will be described. In this area, a common electrode COM, disposed in the touch block, is electrically connected to a second read-out line ROL2 through a third contact hole CNT3.

In this touch block, gate lines GL, a photo-control line PCL, and a photo-driving line PDL may be disposed in a direction. The gate lines GL, the photo-control line PCL, and the photo-driving line PDL may be disposed on the same layer and may be made of the same material.

In addition, data lines DL and read-out lines ROL may be disposed in a direction intersecting the gate lines GL. The data lines DL and the read-out lines ROL may be disposed on the same layer and be made of the same material.

A pixel electrode PXL may be disposed in each of the subpixels SP, and the common electrode COM may be disposed on the same layer as the pixel electrode PXL. The pixel electrode PXL may be electrically connected to a second electrode DE2 of the driving transistor DRT through a first contact hole CNT1.

In addition, first electrodes PE1 of two or more phototransistors PHT, disposed in the touch block, may be electrically connected to a photo-driving line PDL through fourth contact holes CNT4a and CNT4b, and second electrodes PE2 of the phototransistors PHT may be electrically connected to the common electrode COM through a fifth contact hole CNT5.

Here, the common electrode COM may include a main common electrode COMm disposed on the same layer as the pixel electrode PXL and a subsidiary common electrode COMs disposed on a different layer from the pixel electrode PXL. In addition, for example, the subsidiary common electrode COMs may be disposed on a layer, on which the gate line GL is disposed, and be made of the same materials as the gate line GL.

Such a subsidiary common electrode COMs, for example, may be comprised of rectangular sections respectively disposed on a single subpixel SP. The sections of the subsidiary common electrode COMs, disposed on adjacent subpixels SP in the same touch block, may be connected to each other.

addition, the subsidiary common electrode COMs may be electrically connected to the main common electrode COMm through a second contact hole CNT2.

In addition, the subsidiary common electrode COMs may be disposed such that a portion thereof overlaps the second electrode DE2 of the driving transistor DRT.

That is, since the subsidiary common electrode COMs is disposed to overlap the second electrode DE2 of the driving transistor DRT, to which the data signal Vdata is applied, capacitance can be generated between the common electrode COM and the second electrode DE2 of the driving transistor DRT.

As described above, the subsidiary common electrode COMs is disposed on a different layer from the main common electrode COMm, such that an area in which capacitance is to be generated can be obtained between the common electrode COM and the second electrode of the driving transistor DRT, even in the case that the main common electrode COMm is disposed on the same layer as the pixel electrode PXL.

Here, since the sections of the subsidiary common electrode COMs, disposed in adjacent subpixels SP, are connected to each other, as can be seen from portion Y of FIG. 19, a portion of the subsidiary common electrode COMs may overlap a data line DL1, such that parasitic capacitance can be generated. Due to such parasitic capacitance, the data signal Vdata applied to the data lines DL (DL1, DL2, and . . . ) may be delayed, or the sensitivity of signals detected using the common electrodes COM may be lowered.

Exemplary embodiments provide a solution able to prevent the data signal Vdata from being delayed and the sensitivity of detection from being lowered by minimizing parasitic capacitance generated between the subsidiary common electrodes COMs and the data lines DL.

Figure 20:
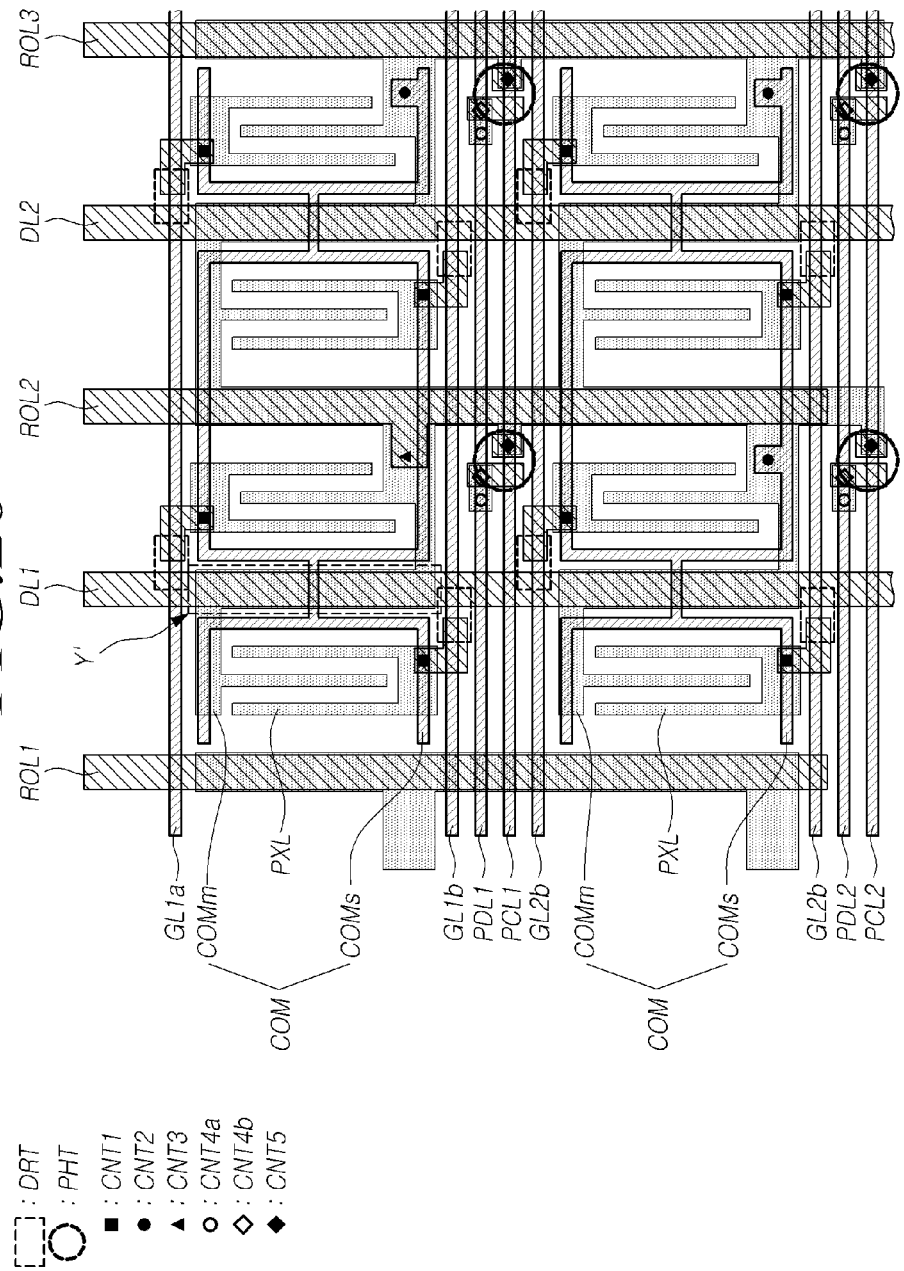

FIG. 20 illustrates another structure of the common electrode COM disposed in the display panel DISP according to exemplary embodiments.

Referring to FIG. 20, an area corresponding to a single common electrode COM will be described. In this area, gate lines GL, a photo-control line PCL, and a photo-driving line PDL may be disposed in a single direction, while data lines DL and read-out lines ROL may be disposed in a direction intersecting the single direction.

In addition, pixel electrodes PXL and a main common electrode COMm are disposed on the same layer, and a subsidiary common electrode COMs may be disposed on a layer on which the gate lines GL are disposed. The main common electrode COMm and the subsidiary common electrode COMs may be electrically connected to each other through a second contact hole CNT2.

The subsidiary common electrode COMs may include, for example, a rectangular section disposed on two subpixels SP disposed on both sides of a read-out line ROL.

Here, the subsidiary common electrode COMs may have C-shaped sections disposed on subpixels SP corresponding to boundaries of the touch block. In some cases, the subsidiary common electrode COMs may have rectangular sections disposed on the boundary subpixels SP, respectively.

In addition, the sections of the subsidiary common electrode COMs, disposed in adjacent subpixels SP, may be connected to each other.

Here, the sections of the subsidiary common electrode COMs, disposed on adjacent subpixels SP, may be connected to each other via a single connecting portion, as can be seen from portion Y' of FIG. 20. Since the connecting portion between the sections of the subsidiary common electrode COMs disposed on adjacent subpixels SP is minimized, parasitic capacitance generated between the subsidiary common electrode COMs and the data line DL can be minimized.

In addition, no portions of the subsidiary common electrode COMs, extending in the same direction as the read-out lines ROL, may be present on both sides of the read-out lines ROL. That is, a portion of the subsidiary common electrode COMs, by which portions of the subsidiary common electrode COMs opposite to and overlapping second electrodes PE2 of driving transistors DRT in the adjacent subpixels SP are connected, may be minimized to improve the transmittance of the subpixels SP.

Since the connecting portion of the portions of the subsidiary common electrode COMs disposed in the adjacent subpixels SP is minimized as described above, it is possible to reduce parasitic capacitance between the common electrode COM and the data lines DL and improve the transmittance of the subpixels SP.

In addition, according to exemplary embodiments, the subsidiary common electrode COMs is disposed so as not to overlap the data lines DL, such that parasitic capacitance between the common electrode COM and the data lines DL can be further reduced.

Figure 21:
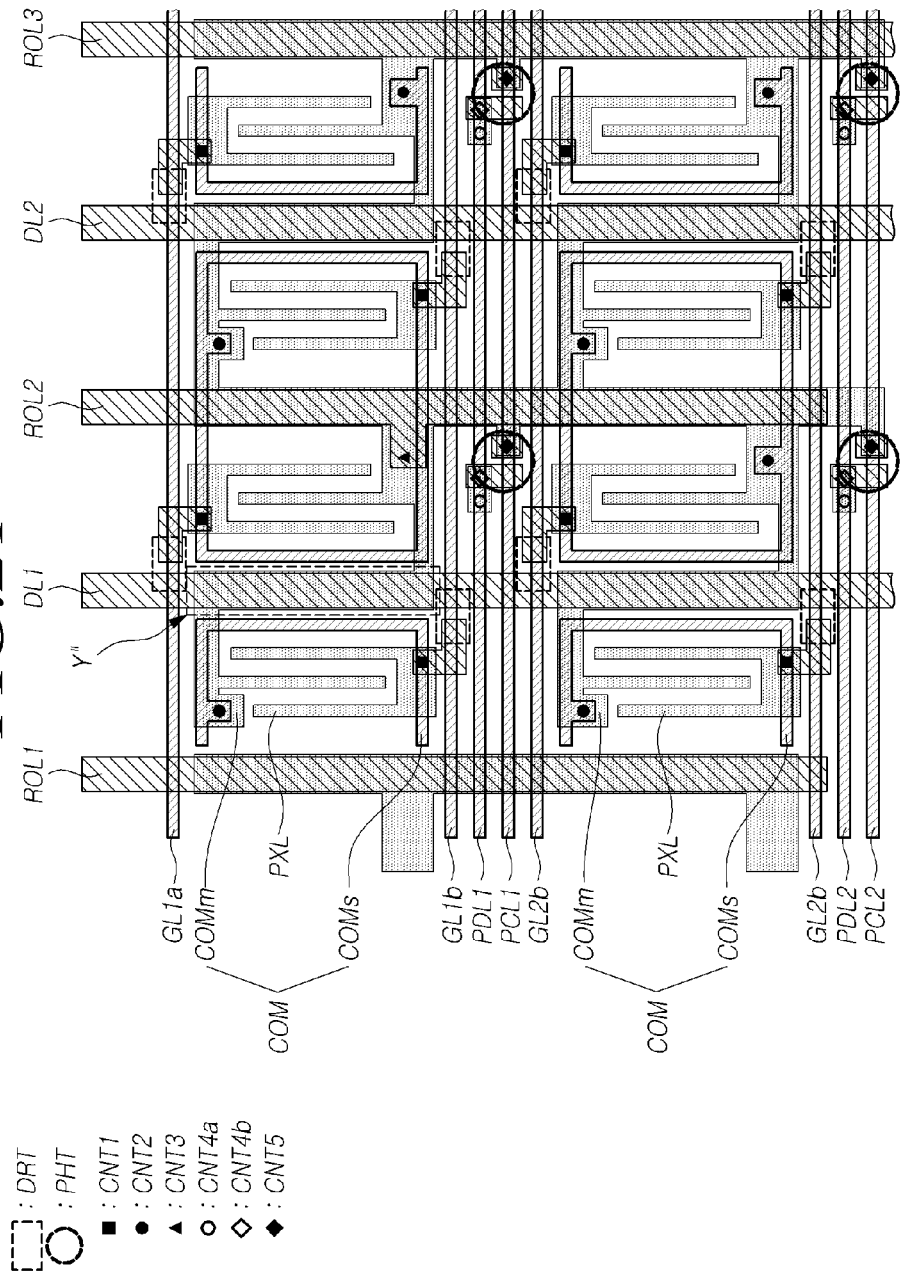

FIG. 21 illustrates another structure of the common electrode COM disposed in the display panel DISP according to exemplary embodiments.

Referring to FIG. 21, in an area corresponding to a single common electrode COM, gate lines GL, a photo-control line PCL, and a photo-driving line PDL are disposed in a single direction, and data lines DL and read-out lines ROL are disposed in a direction intersecting the single direction.

In addition, pixel electrodes PXL and a main common electrode COMm may be disposed on the same layer, and a subsidiary common electrode COMs electrically connected to the main common electrode COMm may be disposed on the same layer as the gate lines GL.

The subsidiary common electrode COMs may have a rectangular section disposed on two subpixels SP. In addition, the subsidiary common electrode COMs may have C-shaped sections disposed on subpixels corresponding to boundaries of the touch block. In some cases, the subsidiary common electrode COMs may have rectangular sections disposed on the boundary subpixels SP, respectively.

Here, the sections of the subsidiary common electrode COMs, disposed on adjacent subpixels SP disposed on both sides of each of the data lines DL, may be separated from each other. That is, as can be seen from portion Y" of FIG. 21, the subsidiary common electrode COMs may not overlap the data lines DL.

In addition, the subsidiary common electrode COMs comprised of the separately-disposed rectangular sections may be electrically connected to the main common electrode COMm through second contact holes CNT2.

Accordingly, the subsidiary common electrode COMs disposed in a single touch block may be electrically connected to the main common electrode COMm while not overlapping the data lines DL, thereby preventing parasitic capacitance from being generated between the subsidiary common electrode COMs and the data lines DL.

In addition, no portions of the subsidiary common electrode COMs, extending in the same direction as the read-out lines ROL, may be present on both sides of the read-out lines ROL, thereby improving the transmittance of the subpixels SP.

Since parasitic capacitance between the subsidiary common electrode COMs and the data lines DL is minimized as described above, it is possible to improve the sensitivity of detection using the common electrodes COM while preventing the data signal Vdata from being delayed due to parasitic capacitance.

FIGS. 22 to 25 illustrate various types of light-based input environment provided by the display device according to exemplary embodiments.

The display device according to exemplary embodiments may provide various types of touch-based input environment in which a user can input data or instructions to the device using a finger, a pen, or the like.

Here, various types of touch input may include, for example, a one-tap input in which an input is recognized when the user taps a point one time in a relatively-short period of time, a double-tap input in which an input is recognized when the user taps a point two consecutive times in a relatively-short period of time, a holding touch input (or holding input) in which an input is recognized when the user taps a point in a relatively-long period of time, a dragging input in which the user drags from one point to another point, and the like.

The display device according to exemplary embodiments may provide various types of application processing according to the various types of touch input, depending on the various types of touch input environment provided. The various types of application processing may include, for example, selective processing of selecting an object (e.g., an icon, a button, a text image, a piece of contents, a uniform resource locator (URL) address, a keyboard button, and the like) at a corresponding point on a screen, handwriting or drawing processing, and execution processing of executing an application program or the like linked to a point at which a touch input is performed.

In addition, the display device according to exemplary embodiments may provide various types of light-based input environment equivalent to the various types of touch input environment. In addition, the display device according to exemplary embodiments may provide various types of application processing according to various types of light-based input, in the same manner as in the case of providing the various types of application processing according to the various types of touch input.

The user may illuminate an intended point on the display panel DISP with light by pressing a button of the beam generator BG.

The user may adjust the number of light illuminations by adjusting the number of times that the user presses the button, adjust a period during which light is continuously illuminated by adjusting a period (or holding period) during which the button of the beam generator BG is pressed, e.g., in a relatively-short period of time or a relatively-long period of time, or move a point illuminated with light by moving the beam generator BG while keeping pressing the button of the beam generator BG. As described above, the user may diversify the types of light-based input by manipulating the beam generator BG in various manners.

Accordingly, as the number of times, the period of time, or the like, of the photo response of the phototransistor PHT at the light-illuminated position is changed, the amount of a leakage current (or off-current) flowing through the phototransistor PHT may be changed, the number of times or the period of time of the leakage current (or off-current) continuously flowing through the phototransistor PHT may be changed, or phototransistors PHT responding to light may be changed, thereby changing a pattern of sensing values (e.g., Vout) in the multi-sensing circuit MSC. The multi-controller MCTR can distinguish the types of light-based input by detecting a change in the pattern of sensing values (e.g., Vout) in the multi-sensing circuit MSC.

The multi-sensing circuit MSC of the display device according to exemplary embodiments generates sensing data by detecting a signal Vs, output from the phototransistor PHT that has responded to illumination light, from the common electrode COM as a sensing signal ROS. The multi-controller MCTR may detect light-illuminated coordinates (or photo-coordinates) on the display panel DISP on the basis of the sensing data output from the multi-sensing circuit MSC.

In addition, the multi-controller MCTR may recognize detection time points of the light-based input while detecting the light-illuminated coordinates (or photo-coordinates) on the basis of the sensing data output from the multi-sensing circuit MSC, and calculate a period of time during which the same light-illuminated coordinates (or photo-coordinates) are continuously detected as a continuous detection time CST on the basis of the recognized detection time points and the detected light-illuminated coordinates.

Here, the detection time points may include a detection start time point Ts and a detection complete time point Te. The detection start time point Ts and the detection complete time point Te are points in time at which the continuous detection time CST, during which the same light-illuminated coordinates (or photo-coordinates) are continuously detected, starts and is completed. The continuous detection time CST corresponds to a period of time during which the user has continuously illuminated the same point with light using the beam generator BG.

Hereinafter, various types of light-based input corresponding to the various types of touch input (e.g., one-tap input, double-tap input, or dragging) and methods of recognizing the same will be described.

Figure 22:
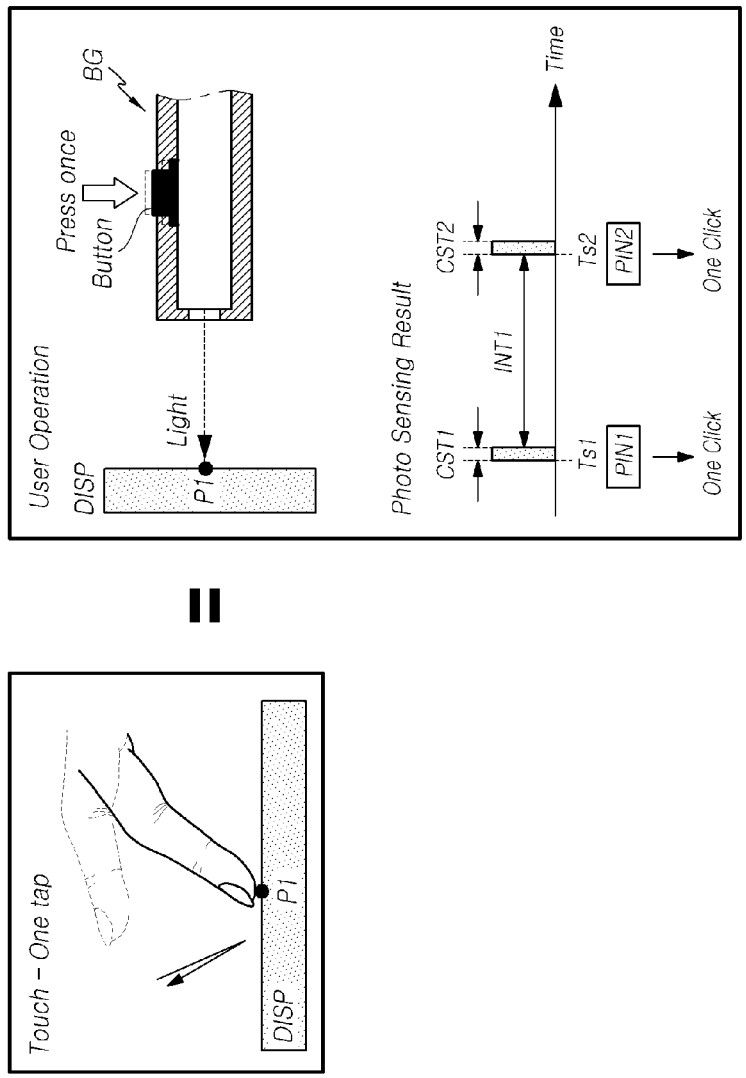
FIGS. 22 to 25 illustrate various types of light-based input environment provided by the display device according to exemplary embodiments.

Referring to FIG. 22, the user may perform a first one-tap-type light-based input PIN1 by performing a light illuminating action of illuminating a point P1 on the display panel DISP with light in a short period of time by pressing the button of the beam generator BG at a point in time Ts1 in a short period of time.

Afterwards, the user may perform a second one-tap-type light-based input PIN2 by performing a light illuminating action of re-illuminating the point P1 on the display panel DISP with light in a short period of time by pressing the button of the beam generator BG in a short period of time once again.

On the basis of the sensing data, the multi-controller MCTR may recognize the first light-based input PIN1 by detecting the point P1 as light-illuminated coordinates at the point in time Ts1 (i.e., start time point), and recognize the second light-based input PIN2 by detecting the point P1 (or another point) as light-illuminated coordinates at the point in time Ts2 after an interval of time INT1 from the point in time Ts1 (i.e., start time point).

In addition to this primary recognition result, in order to distinguish the types of light-based input, the multi-controller MCTR may compare the interval of time INT1 between the point in time Ts1 and the point in time Ts2 with a predetermined threshold interval INT_TH, and compare a continuous detection time CST1 of the first light-based input PIN1 and a continuous detection time CST2 of the second light-based input PIN2 with a threshold continuous detection time CST_TH. In the illustration of FIG. 22, the point in time Ts1 (start time point) and a point in time Te1 (complete time point) of the continuous detection time CST1 of the first light-based input PIN1 are regarded as being substantially the same. In addition, the point in time Ts2 (start time point) and a point in time Te2 (complete time point) of the continuous detection time CST2 of the second light-based input PIN2 are regarded as being substantially the same.

According to the light-illuminating action of the user illustrated in FIG. 22, the interval of time INT1 between the point in time Ts1 and the point in time Ts2 is longer than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes the first light-based input PIN1 and the second light-based input PIN2 as separate one-tap-type light-based inputs, distinguishable from each other.

Figure 23:
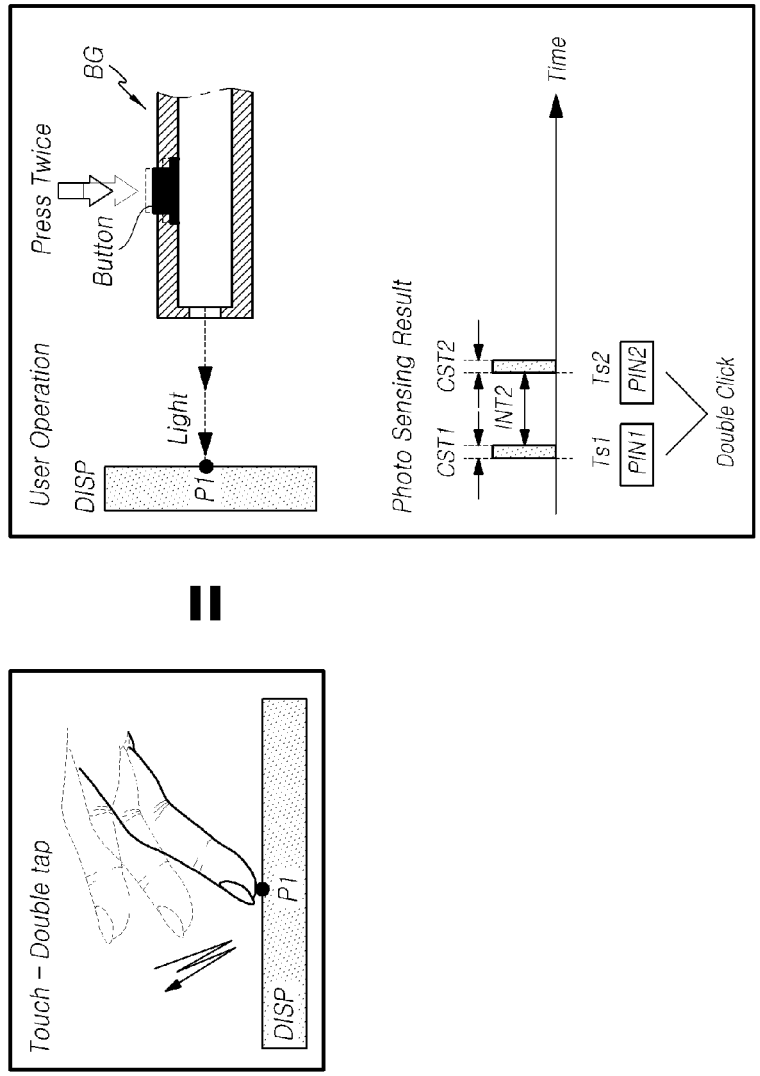

Referring to FIG. 23, the user may perform a double-tap-type light light-based input by performing a light-illuminating action of consecutively illuminating a point P1 on the display panel DISP with light in two short periods of time by rapidly pressing the button of the beam generator BG in two short periods of time.

On the basis of the sensing data, the multi-controller MCTR recognizes a first light-based input PIN1 by detecting the point P1 as light-illuminated coordinates at a point in time Ts1, and recognizes a second light-based input PIN2 by detecting the point P1 as light-illuminated coordinates at a point in time Ts2 after a predetermined period of time INT2 from the point in time Ts1.

In addition to this primary recognition result, in order to distinguish the types of light-based input, the multi-controller MCTR compares an interval of time INT2 between the point in time Ts1 and the point in time Ts2 with the predetermined threshold interval INT_TH, and compares a continuous detection time CST1 of the first light-based input PIN1 and a continuous detection time CST2 of the second light-based input PIN2 with the predetermined threshold continuous detection time CST_TH. In the illustration of FIG. 23, a point in time Ts1 (start time point) and a point in time Te1 (complete time point) of the continuous detection time CST1 of the first light-based input PIN1 are regarded as being substantially the same. In addition, a point in time Ts2 (start time point) and a point in time Te2 (complete time point) of the continuous detection time CST2 of the second light-based input PIN2 are regarded as being substantially the same.

According to the light-illuminating action of the user illustrated in FIG. 23, the interval of time INT2 between the point in time Ts1 and the point in time Ts2 is equal to or less than the threshold interval INT_TH. In addition, each of the continuous detection time CST1 of the first light-based input PIN1 and the continuous detection time CST2 of the second light-based input PIN2 is shorter than the threshold continuous detection time CST_TH.

Accordingly, the multi-controller MCTR recognizes both the first light-based input PIN1 and the second light-based input PIN2 as a single light-based input corresponding to the double-tap type light-based input.

Figure 24:
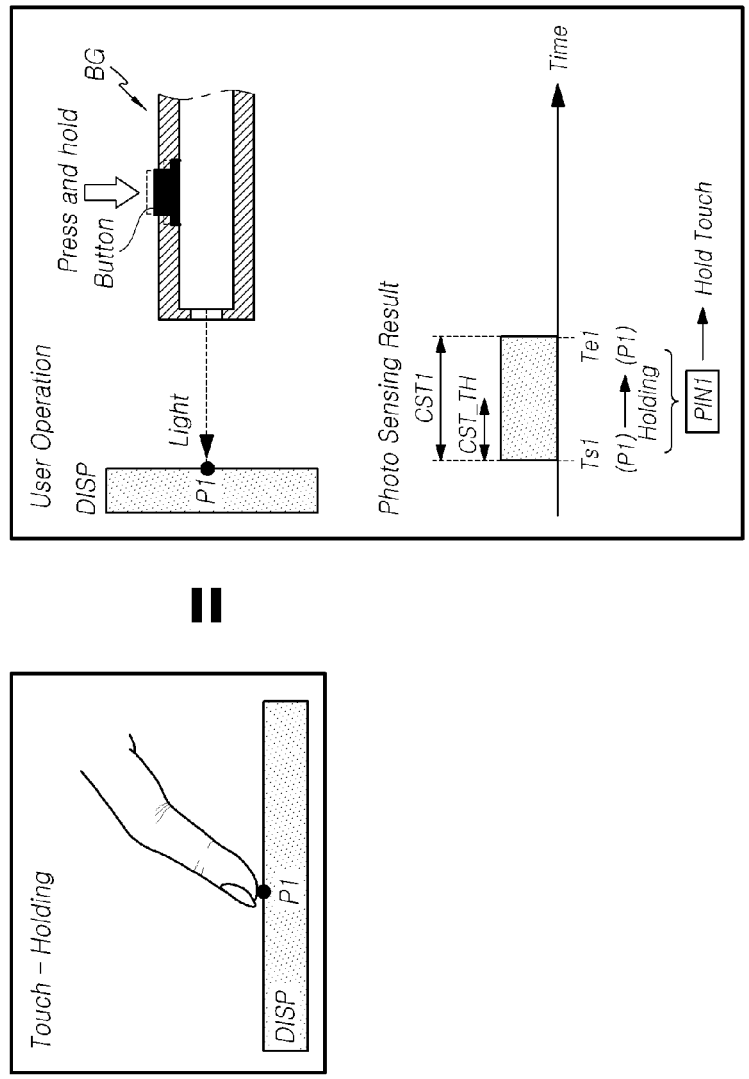

Referring to FIG. 24, the user may perform a holding touch-type light-based input by performing a light-illuminating action of illuminating a point P1 on the display panel DISP with light for a predetermined period of time or more by continuously pressing the button of the beam generator BG in a relatively-long period of time.

On the basis of the sensing data, the multi-controller MCTR recognizes a first light-based input PIN1 by continuously detecting a point P1 as light-illuminated coordinates during a continuous detection time CST1 from a point in time Ts1 to a point in time Te1.

In addition to this primary recognition result, in order to distinguish the types of light-based input, the multi-controller MCTR compares the continuous detection time CST1 of the first light-based input PIN1 with the threshold continuous detection time CST_TH.

According to the light-illuminating action of the user illustrated in FIG. 24, the continuous detection time CST1 of the first light-based input PIN1 is longer than the threshold continuous detection time CST_TH.

Accordingly, the multi-controller MCTR recognizes the first light-based input PIN1 as a holding touch-type light-based input.

Figure 25:
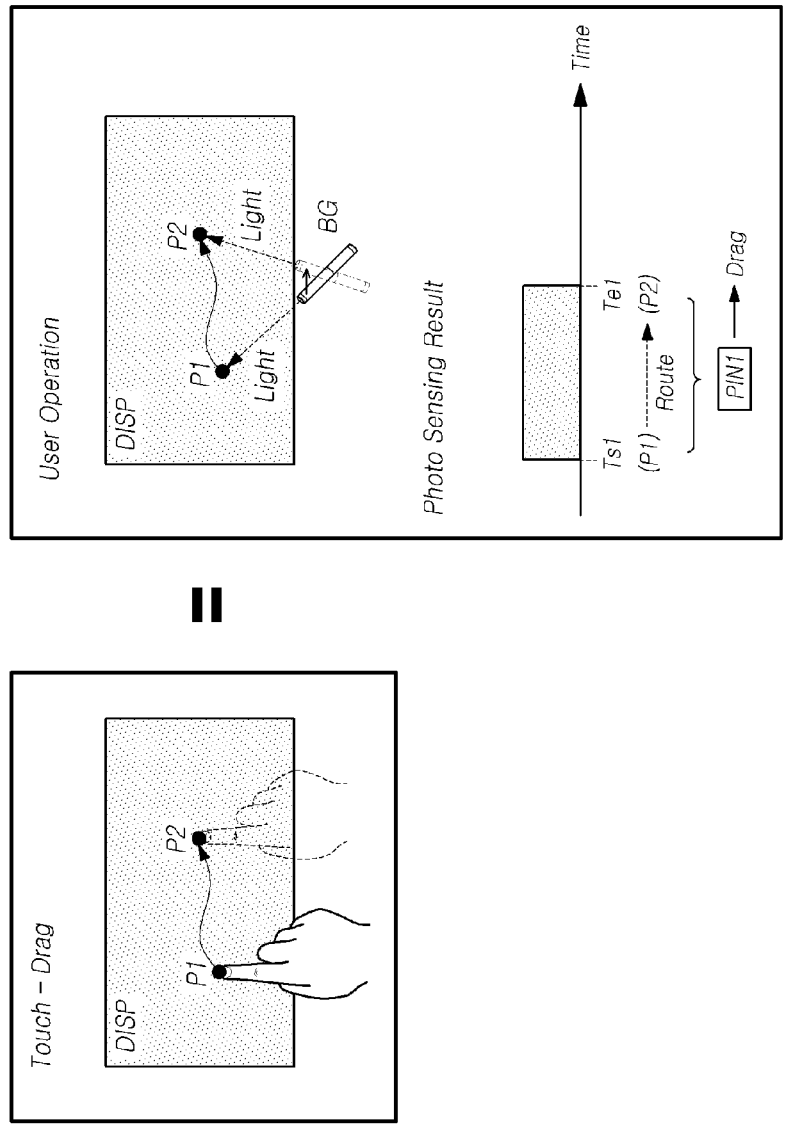

Referring to FIG. 25, the user may perform a dragging light-based input by performing a light-illuminating action of illuminating the display panel DISP with light along a route from a point P1 to a point P2 while continuously pressing the button of the beam generator BG in a relatively-long period of time.

On the basis of the sensing data, the multi-controller MCTR recognizes a first dragging light-based input PIN1 by continuously detecting points on the route from the point P1 to the point P2 as light-illuminated coordinates during a continuous detection time CST1 from a point in time Ts1 to a point in time Te1.

The display device according to exemplary embodiments can provide not only the above-described light-based inputs, such as the one-tap-type input, the double-tap-type input, the holding touch-type input, and the dragging input, but also can provide more various light-based input environments, such as a multi-touch-type light-based input and a multidragging light-based input, by modifying or combining the above-described light-based inputs.

As set forth above, according to exemplary embodiments, the display panel DISP, the display device, and the driving circuit have both a touch sensing function and a photosensing function.

In addition, according to exemplary embodiments, in the display panel DISP, the display device, and the driving circuit, the touch sensor configuration, including COM and ROL, and the photosensor configuration, including PHT, PDL, PCL, COM, ROL, and Cs, are efficiently designed.

Furthermore, according to exemplary embodiments, the display panel DISP, the display device, and the driving circuit have a high aperture ratio even in the case that both the touch sensor configuration, including COM and ROL, and the photosensor configuration, including PHT, PDL, PCL, COM, ROL, and Cs, are included.

In addition, according to exemplary embodiments, in the display panel DISP, the display device, and the driving circuit, the electrode and line structures, including COM, ROL, PDL, and PCL, for the touch sensing and the photosensing, are efficiently designed.

Furthermore, according to exemplary embodiments, the display panel DISP, the display device, and the driving circuit can provide various types of light-based input environment to users.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:
 a plurality of subpixels;
 a plurality of data lines and a plurality of gate lines configured to drive the plurality of subpixels;
 a plurality of phototransistors respectively including a gate electrode configured to receive a photo-control signal, a first electrode configured to receive a photo-driving signal, and a second electrode serving as a signal output node configured to output a signal to the second electrode in response to illumination light; and
 a plurality of photo-driving lines and a plurality of photo-control lines configured to transfer the photo-driving signal and the photo-control signal, respectively, to the plurality of phototransistors,
 wherein a first subpixel row, a second subpixel row, a third subpixel row, and a fourth subpixel row, respectively include subpixels among the plurality of subpixels,
 the plurality of phototransistors include a first phototransistor and a second phototransistor positioned between the first subpixel row and the second subpixel row,
 a first photo-driving line among the plurality of photo-driving lines and a first photo-control line among the plurality of photo-control lines are positioned between the first subpixel row and the second subpixel row,
 the first photo-driving line is configured to transfer the photo-driving signal to the first electrode of each of the first phototransistor and the second phototransistor,
 the first photo-control line is configured to transfer the photo-control signal to the gate electrode of each of the first phototransistor and the second phototransistor, and
 the first photo-driving line and the first photo-control line overlap each other at one or more points of overlap.

2. The display panel according to claim 1, further comprising:
 a photocapacitor is electrically connected to the second electrode and the gate electrode of the phototransistor.

3. The display panel according to claim 1, wherein one of the gate electrode of the first phototransistor or the gate electrode of the second phototransistor is positioned adjacent to the first subpixel row, and the other one of the gate electrode of the first phototransistor or the gate electrode of the second phototransistor is positioned adjacent to the second subpixel row.

4. The display panel according to claim 1, wherein each of the points of overlap between the first photo-driving line and the first photo-control line is located between the first phototransistor and the second phototransistor, and overlaps a corresponding data line among the plurality of data lines.

5. The display panel according to claim 1, wherein the plurality of phototransistors further include a third phototransistor and a fourth phototransistor positioned between the second subpixel row and the third subpixel row,
 a second photo-driving line among the plurality of photo-driving lines and a second photo-control line among the plurality of photo-control lines are positioned between the second subpixel row and the third subpixel row,
 the second photo-driving line is configured to transfer the photo-driving signal to the first electrode of each of the third phototransistor and the fourth phototransistor,
 the second photo-control line is configured to transfer the photo-control signal to the gate electrode of each of the third phototransistor and the fourth phototransistor, and
 the second photo-driving line and the second photo-control line overlap each other at one or more points of overlap.

6. The display panel according to claim 1, wherein none of the plurality of phototransistors, the plurality of photo-driving lines, and the plurality of photo-control lines are positioned between the second subpixel row and the fourth subpixel row.

7. The display panel according to claim 1, wherein each of the points of overlap between the first photo-driving line and the first photo-control line is located between the first phototransistor and the second phototransistor, and is located between a read-out line, electrically connected to the second electrode of each of the first phototransistor and the second phototransistor, and a corresponding data line among the plurality of data lines.

8. The display panel according to claim 1, wherein the first photo-driving line and the first photo-control line are positioned between a first gate line, among the plurality of gate lines, configured to transfer a scan signal to the first subpixel row, and a second gate line, among the plurality of gate lines, configured to transfer the scan signal to the second subpixel row.

9. The display panel according to claim 1, wherein the first subpixel row includes first to fifth subpixels,
the plurality of data lines include a first data line configured to transfer a data signal sequentially to the first subpixel and the second subpixel, and a second data line configured to transfer the data signal sequentially to the third subpixel and the fourth subpixel, and
the plurality of gate lines include a first gate line configured to transfer a scan signal sequentially to the first subpixel, the third subpixel, and the fifth subpixel, and a second gate line configured to transfer the scan signal sequentially to the second subpixel and the fourth subpixel.

10. The display panel according to claim 9, further comprising:
a first common electrode to which the second electrode of the first phototransistor and the second electrode of the second phototransistor are electrically connected;
a first read-out line positioned between the second subpixel and the third subpixel; and
a second read-out line positioned between the fourth subpixel and the fifth subpixel,
wherein one of the first read-out line or the second read-out line is electrically connected to the first common electrode to which the second electrode of the first phototransistor and the second electrode of the second phototransistor are commonly connected, and
the other one of the first read-out line or the second read-out line is electrically connected to neither the second electrode of the first phototransistor nor the second electrode of the second phototransistor, and is electrically connected to the second common electrode positioned in the same row as the first common electrode in the display panel and insulated from the first common electrode.

11. The display panel according to claim 10, wherein each of the first read-out line and the second read-out line overlaps both the first common electrode and the second common electrode,
two or more data lines, among the plurality of data lines, overlapping the first common electrode, are the same as two or more data lines, among the plurality of data lines, overlapping the second common electrode, and
each of the first read-out line and the second read-out line is positioned in the same direction as the overlapping two or more data lines.

12. The display panel according to claim 10, wherein each of the first common electrode and the second common electrode includes a main electrode and a subsidiary electrode made of different materials and contacting each other at one or more points,
the main electrode includes the same material as a pixel electrode in each of the plurality of subpixels, and
the subsidiary electrode is made of the same material as at least one of the plurality of gate lines or the first photo-control line.

13. The display panel according to claim 1, wherein the display panel is divided into an active area serving as a display area and a non-active area serving as a non-display area,
the non-active area includes a dummy pixel area that includes a plurality of dummy subpixels,
one or more dummy phototransistors, a main photo-driving line, among the plurality of photo-driving lines, to which the first photo-driving line is electrically connected, and a main photo-control line, among the plurality of photo-control lines, to which the first photo-control line is electrically connected, are positioned in the dummy pixel area, and
the first photo-driving line and the first photo-control line extend in the same direction as the plurality of gate lines, and the main photo-driving line and the main photo-control line extend in the same direction as the plurality of data lines overlapping the plurality of gate lines.

14. The display panel according to claim 13, wherein at least one of the main photo-driving line or the main photo-control line is electrically connected to the plurality of dummy subpixels.

15. The display panel according to claim 13, wherein the main photo-driving line and the main photo-control line include the same material as the plurality of data lines.

16. The display panel according to claim 1, wherein each of the plurality of subpixels includes a pixel electrode and a driving transistor configured to transfer the data signal to the pixel electrode,
wherein, if a top surface of the display panel corresponds to a viewing surface, a touch surface, and a light illumination surface,
a gate electrode of the driving transistor and the gate electrode of each phototransistor among the plurality of phototransistors are located on the same layer, an active layer of the driving transistor and an active layer of the phototransistor are located on the same layer, and the active layer of the driving transistor and the active layer of the phototransistor are located above the gate electrode of the driving transistor and the gate electrode of the phototransistor, respectively.

17. The display panel according to claim 1, wherein each of the plurality of subpixels includes a pixel electrode and a driving transistor transferring the data signal to the pixel electrode,
wherein, if a bottom surface of the display panel corresponds to a viewing surface, a touch surface, and a light illumination surface,
an active layer of the driving transistor is located above a gate electrode of the driving transistor, and an active layer of each phototransistor among the plurality of phototransistors is located below the gate electrode of the phototransistor,
the first electrode and the second electrode of the phototransistor are located on the same layer as the gate electrode of the driving transistor, and the gate electrode of the phototransistor is located on the same layer as a first electrode and a second electrode of the driving transistor, and
the active layer of the phototransistor is located on a different layer from the active layer of the driving transistor.

18. The display panel according to claim 1, wherein each of the plurality of subpixels includes a pixel electrode and a driving transistor configured to transfer the data signal to the pixel electrode,
wherein, if a bottom surface of the display panel corresponds to a viewing surface, a touch surface, and a light illumination surface,
an active layer of the driving transistor is located above a gate electrode of the driving transistor, and a first electrode and a second electrode of the driving transistor are located on the active layer, an active layer of each phototransistor among the plurality of phototransistors is located below the gate electrode of the phototransistor, and the first electrode and the second electrode of the phototransistor are located between the active layer and the gate electrode of the phototransistor, the gate electrode of the phototransistor includes the same material as the first electrode and the second electrode of the driving transistor, and the first electrode and the second electrode of the phototransistor includes the same material as the gate electrode of the driving transistor, the active layer of the phototransistor is located on a different layer from the active layer of the driving transistor, and a semiconductor material layer is positioned below the gate electrode of the driving transistor, and includes the same material as the active layer of the phototransistor.

19. The display panel according to claim 1, wherein, during a display driving period, photo-driving lines among the plurality of photo-driving lines and photo-control lines among the plurality of photo-control lines are floated or the photo-driving signal and the photo-control signal respectively having a predetermined voltage level are applied to photo-driving lines among the plurality of photo-driving lines and photo-control lines among the plurality of photo-control lines, during a blank period after the display driving period, the voltage level of each of the photo-driving signal and the photo-control signal swings.

20. The display panel according to claim 19, wherein, during the blank period, a touch driving signal having a swinging voltage level is applied to a first common electrode, to which the second electrode of the first phototransistor and the second electrode of the second phototransistor are electrically connected, and at least one of a frequency, a phase, or an amplitude of either the photo-driving signal or the photo-control signal corresponds to that of the touch driving signal.

21. The display panel according to claim 19, wherein, during the blank period, the photo-control signal swings in a range of a turn-off voltage, by which a phototransistor is turned off.

22. A display panel, comprising:
a plurality of subpixels;
a plurality of data lines and a plurality of gate lines configured to drive the plurality of subpixels;
a plurality of phototransistors respectively including a gate electrode configured to receive a photo-control signal, a first electrode configured to receive a photo-driving signal, and a second electrode serving as a signal output node configured to output a signal to the second electrode in response to illumination light; and
a plurality of photo-driving lines and a plurality of photo-control lines configured to transfer the photo-driving signal and the photo-control signal, respectively, to the plurality of phototransistors,
wherein a first subpixel row, a second subpixel row, a third subpixel row, and a fourth subpixel row, respectively include subpixels among the plurality of subpixels,
the plurality of phototransistors include a first phototransistor and a second phototransistor positioned between the first subpixel row and the second subpixel row, and between the first subpixel row and the second subpixel row, a first photo-driving line and a second photo-driving line, among the plurality of photo-driving lines, to which the first electrode of the first phototransistor and the first electrode of the second phototransistor are electrically connected, respectively, and a shared photo-control line, among the plurality of photo-control lines, to which the gate electrode of the first phototransistor and the gate electrode of the second phototransistor are electrically connected, are disposed, or a first photo-control line and a second photo-control line, among the plurality of photo-control lines, to which the gate electrode of the first phototransistor and the gate electrode of the second phototransistor are electrically connected, respectively, and a shared photo-driving line, among the plurality of photo-driving lines, to which the first electrode of the first phototransistor and the first electrode of the second phototransistor are electrically connected, are disposed.

23. The display panel according to claim 22, wherein none of the plurality of phototransistors, the plurality of photo-driving lines, and the plurality of photo-control lines are positioned between the second subpixel row and the third subpixel row.

24. A display device, comprising:
a display panel including a plurality of data lines, a plurality of gate lines, a plurality of subpixels, a plurality of common electrodes, a plurality of phototransistors, a plurality of read-out lines electrically connected to the plurality of common electrodes, and a plurality of photo-driving lines and a plurality of photo-control lines configured to transfer a photo-driving signal and a photo-control signal, respectively, to the plurality of phototransistors;
a multi-sensing circuit configured to drive the plurality of common electrodes; and
a photo-driving circuit configured to drive the plurality of photo-driving lines and the plurality of photo-control lines,
wherein each of the plurality of phototransistors includes a gate electrode configured to receive the photo-control signal, a first electrode configured to receive the photo-driving signal, and a second electrode serving as a signal output node configured to output a signal to the second electrode in response to illumination light,
the plurality of common electrodes include a first common electrode and a second common electrode,
the plurality of read-out lines include a first read-out line electrically connecting the first common electrode and the multi-sensing circuit, and a second read-out line electrically connecting the second common electrode and the multi-sensing circuit,
two or more phototransistors among the plurality of phototransistors are positioned in an area of the first common electrode, and
the second electrode of each of the two or more phototransistors is electrically connected to the first common electrode.

25. The display device according to claim 24, wherein, during a display driving period,
the photo-driving circuit floats photo-driving lines among the plurality of photo-driving lines and photo-control lines among the plurality of photo-control lines, or outputs the photo-driving signal and the photo-control signal respectively having a predetermined voltage level to photo-driving lines among the plurality of photo-driving lines and photo-control lines among the plurality of photo-control lines, and the multi-sensing circuit outputs a common voltage having a predetermined voltage level to the plurality of common electrodes through the plurality of read-out lines, and during a blank period after the display driving period, the photo-driving circuit outputs the photo-driving signal and the photo-control signal respectively having a swinging voltage level to photo-driving lines among the plurality of photo-driving lines and photo-control lines among the plurality of photo-control lines, and the multi-sensing circuit outputs a touch driving signal having a swinging voltage level to the plurality of common electrodes through the plurality of read-out lines.

26. The display device according to claim 25, wherein, during the blank period, at least one of a frequency, a phase, or an amplitude of either the photo-driving signal or the photo-control signal corresponds to that of the touch driving signal.

27. The display device according to claim 25, wherein, during the blank period, the photo-control signal swings in a range of a turn-off voltage, by which the phototransistor is turned off.

28. The display device according to claim 24, wherein the multi-sensing circuit outputs sensing data using a signal detected through the plurality of read-out lines, the display device further includes a multi-controller configured to detect a touch or touch coordinates on the display panel, or detect a light illumination or light-illuminated coordinates on the display panel, using the sensing data.

29. The display device according to claim 28, wherein the multi-controller recognizes and distinguishes a type of a light-based input, using the light-illuminated coordinates and a point in time and a continuous detection time of the light-illuminated coordinates.

30. A driving circuit, comprising:
a multi-sensing circuit electrically connected to a plurality of common electrodes, of a display panel, through a plurality of read-out lines of the display panel; and
a photo-driving circuit configured to drive a plurality of photo-driving lines and a plurality of photo-control lines through which a photo-driving signal and a photo-control signal are transferred to a plurality of phototransistors of the display panel,
wherein each of the plurality of phototransistors includes a gate electrode configured to receive the photo-control signal, a first electrode configured to receive the photo-driving signal, and a second electrode serving as a signal output node configured to output a signal to the second electrode in response to illumination light, and
the multi-sensing circuit receives the signal, output from the second electrode of each of the plurality of phototransistors, through a corresponding read-out line among the plurality of read-out lines.

* * * * *